United States Patent
Gamage et al.

(10) Patent No.: US 12,483,493 B2
(45) Date of Patent: *Nov. 25, 2025

(54) SYSTEMS AND METHODS FOR DATA PLANE VALIDATION OF MULTIPLE PATHS IN A NETWORK

(71) Applicant: Cisco Technology, Inc., San Jose, CA (US)

(72) Inventors: Amila Pradeep Kumara Tharaperiya Gamage, Kanata (CA); Rakesh Gandhi, Stittsville (CA); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,612

(22) Filed: Dec. 20, 2023

(65) Prior Publication Data

US 2024/0129223 A1    Apr. 18, 2024

Related U.S. Application Data

(63) Continuation of application No. 17/538,091, filed on Nov. 30, 2021, now Pat. No. 11,882,016.

(51) Int. Cl.
*H04L 45/02* (2022.01)
*H04L 43/50* (2022.01)
*H04L 45/24* (2022.01)

(52) U.S. Cl.
CPC .............. *H04L 45/02* (2013.01); *H04L 43/50* (2013.01); *H04L 45/24* (2013.01)

(58) Field of Classification Search
CPC ......... H04L 43/50; H04L 43/55; H04L 45/02; H04L 45/24
See application file for complete search history.

(56) References Cited

U.S. PATENT DOCUMENTS

| | | | |
|---|---|---|---|
| 10,887,225 B1 * | 1/2021 | Chan | H04L 12/4633 |
| 11,882,016 B2 * | 1/2024 | Gamage | H04L 45/28 |
| 2012/0106347 A1 | 5/2012 | Allan et al. | |
| 2014/0310391 A1 * | 10/2014 | Sorenson, III | H04L 43/0817 709/223 |

(Continued)

OTHER PUBLICATIONS

Mswanathan A., et al., "Evolution of Multiprotocol Label Switching," IEEE Communications Magazine, May 1998, 9 pages.

*Primary Examiner* — Donald L Mills
(74) *Attorney, Agent, or Firm* — Polsinelli P.C.

(57) ABSTRACT

Systems, methods, and computer-readable media are disclosed for validating multiple paths used for routing network traffic in a network. In one aspect, a network controller can identify one or more intermediate nodes on each of multiple paths in a network, wherein the multiple paths begin at a first network node and end at a last network node. The network controller can further generate a data packet with a label at the first network node, forward the test data packet from the first network node, along each of the one or more intermediate nodes, to the last network node, and perform a data plane validation process for validating packet forwarding from the first network node to the last network node based on the label(s) by determining if a number of the multiple paths equals to a number of packets received at the last network node.

20 Claims, 11 Drawing Sheets

(56) References Cited

U.S. PATENT DOCUMENTS

| | | |
|---|---|---|
| 2015/0029855 A1 | 1/2015 | Zheng et al. |
| 2015/0381444 A1 | 12/2015 | Nainar et al. |
| 2016/0127219 A1 | 5/2016 | Akhavain Mohammadi et al. |
| 2018/0359176 A1 | 12/2018 | Nainar et al. |
| 2020/0351188 A1 | 11/2020 | Arora et al. |
| 2021/0092037 A1 | 3/2021 | Rathi et al. |
| 2021/0306257 A1* | 9/2021 | Dutta .................... H04L 45/566 |
| 2021/0367867 A1* | 11/2021 | Arora ...................... H04L 45/50 |
| 2022/0337516 A1 | 10/2022 | Hasan et al. |
| 2024/0235984 A1* | 7/2024 | Chunduri .............. H04L 45/302 |

* cited by examiner

SYSTEMS AND METHODS FOR DATA PLANE VALIDATION OF MULTIPLE PATHS IN A NETWORK

CROSS-REFERENCE TO RELATED APPLICATIONS

This application is a continuation of, and claims priority to U.S. Non-Provisional application Ser. No. 17/538,091 filed on Nov. 30, 2021, the contents of which is incorporated by reference in its entirety.

TECHNICAL FIELD

The present technology pertains to network traffic routing in a network, and more specifically to validating multiple paths used for routing network traffic in a segment routing network as well as IP network.

BACKGROUND

In networks, routing packets from source to destination is a fundamental operation. As the demand for improved network performance has increased rapidly, many communications providers have been in search of a packet switching technology that can manage numerous network nodes to route traffic in and out of large and complex data centers. One of such technologies, segment routing (SR) provides control over the packet forwarding by combining simple network instructions. However, to ensure all packets can be correctly forwarded and sent from source to destination, each of the data paths between various network nodes needs to be validated.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
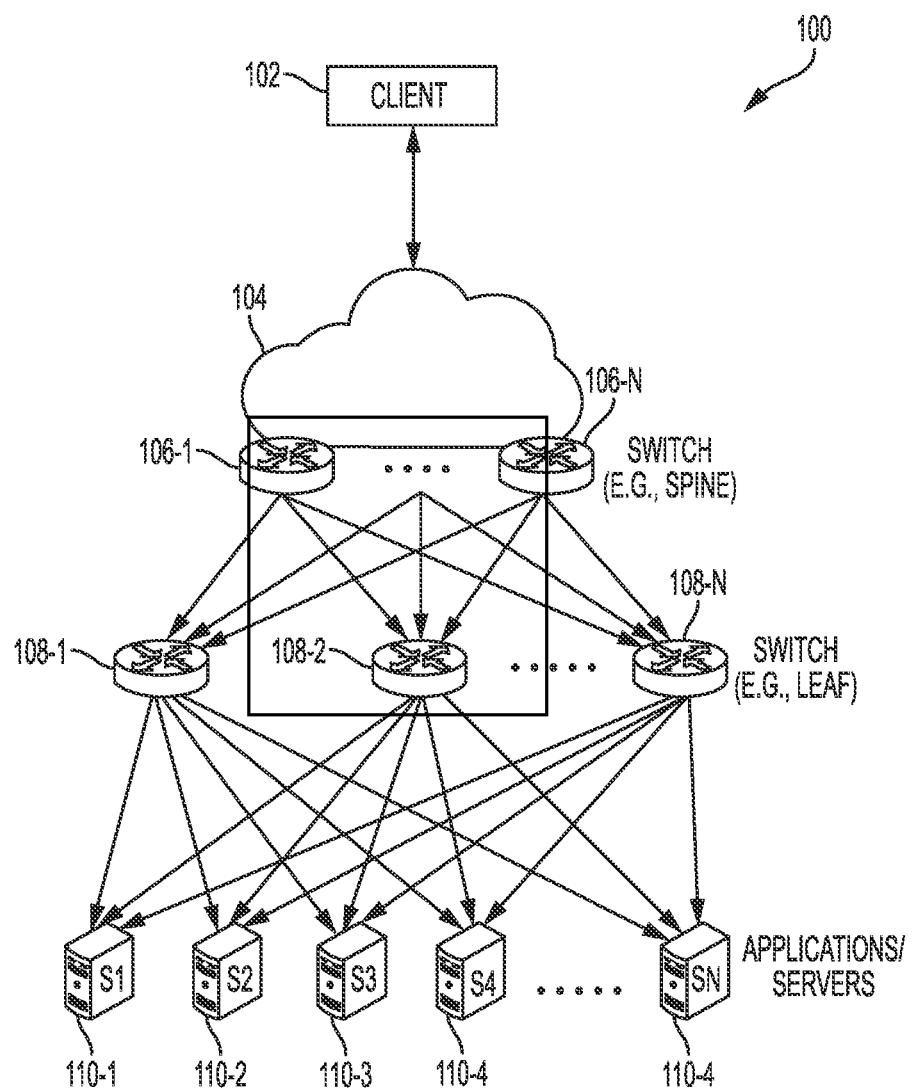
FIG. 1 illustrates a diagram of an example cloud data center architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for a scalable process for validating packet forwarding on multiple paths (e.g., Equal Cost Multiple Paths (ECMPs) used for routing network traffic in a network (e.g., Multi-Protocol Label Switching (MPLS), Segment Routing with MPLS (SR MPLS) or Segment Routing with IPv6 (SRv6) or any IPv4 or IPv6 network without segment routing). More specifically, the present disclosure provides a deterministic process for near-instantaneous measurement of end-to-end performance and validation of SRv6, SR MPLS, IPv6 and IPv4 data planes with ECMPs. In some examples, a special flow label (e.g., a flow label in IPv6, and an entropy label in MPLS) that is referred to as the wildcard flow label (e.g., wild card entropy label in MPLS) may be defined. Each node forwards a received test packet with wildcard flow label to all the ECMP next-hops available for a destination address identified in the packet. This can allow to discover all the ECMP paths between the nodes in a network. In some other examples, a wildcard flow label can carry either the total number of end-to-end ECMPs if already known or record the information from the intermediate nodes to calculate the total number of end-to-end ECMPs on the fly. This number can then be used to validate the data plane. Furthermore, to validate the data plane, headend sends a test packet with a wildcard flow label, Intermediate nodes forward the test packet to all the ECMP next-hops available for the destination address in the packet. A tail-end node receives a test packet via each end-to-end ECMP when data plane has no issue. The tail-end node then consolidates the information in wildcard flow labels of the received packets, performs data plane validation and notifies the headend, accordingly. The notification may include indications of data plane failure detection, end-to-end latency values of the ECMP paths, end-to-end packet loss measurement, etc. In the present disclosure, it is understood that the term "wild card label," "special flow label," "flow label", or "entropy label," can also referred to as a "label."

In one aspect, a method of validating packet forwarding on multiple paths in a network includes generating, at a first network node, a test data packet with a label to be sent along each of multiple paths in the network between the first network node and a last network node, forwarding the test data packet from the first network node, along each of the one or more intermediate nodes along each of the multiple paths, to the last network node, and performing a data plane validation process for validating packet forwarding from the first network node to the last network node based on the label. The data plane validation process may include determining if a number of the multiple paths equals to a number of packets received at the last network node.

In another aspect, the method of validating packet forwarding on multiple paths further includes identifying, by a network controller or the first network node, one or more intermediate nodes on each of multiple paths in the network, wherein the multiple paths begin at the first network node and end at the last network node.

In another aspect, the method of validating packet forwarding on multiple paths further includes modifying the label at an intermediate node in the network that has multiple subsequent nodes.

In another aspect, when the label includes the number of packets to be received at the last network node, the data plane validation process is performed by at least one of the first network node, the last network node, a path computation element (PCE), or a network controller based on the label.

In another aspect, when the label includes information associated with the number of packets to calculate the number of packets to be received at the last network node, the data plane validation process is performed by either the first network node or the last network node based on the label in each of the received packets.

In another aspect, the information associated with the number of packets includes three values comprising: a level of the multiple paths of a node that last modified the label, a level of the multiple paths of a node whose multiplier is in the label, and a multiplier representing a number of subsequent nodes.

In another aspect, the data plane validation process fails if the number of multiple paths is not equal to the number of packets received by the last network node. If the data plane validation process fails, the method further includes locating a failure in the network. Also, the locating the failure includes sending the label including a time-to-live (TTL) field in a header of the test data packet, wherein the TTL field becomes zero at one or more node-N, sending one or more expiry or error messages from each of the one or more node-N to the first network node, determining that a number of the one or more expiry or error messages is not equal to a total number of multiple paths from the first network node to the one or more node-N, and determining that the failure in forwarding packets has occurred between the one or more node-N and an immediate previous node of the one or more node-N.

In another aspect, each of the first network node, the last network node, and the one or more intermediate nodes is a router for segment routing. Also, the segment routing is routing data plane traffic of at least one of Multi-Protocol Label Switching (MPLS), IPv4, or IPv6 network.

In one aspect, a system for validating packet forwarding on multiple paths in a network includes one or more computer-readable media comprising computer-readable instructions and one or more processors. The one or more processors are configured to execute the computer-readable instructions to generate, at the first network node, a test data packet with a label to be sent along each of multiple paths in the network between the first network and a last network node, forward the test data packet from the first network node, along each of the one or more intermediate nodes along each of the multiple paths, to the last network node, and perform a data plane validation process for validating packet forwarding from the first network node to the last network node based on the label. The data plane validation process may include determining if a number of the multiple paths equals to a number of packets received at the last network node.

In one aspect, one or more non-transitory computer-readable media include computer-readable instructions, which when executed by one or more processors, cause the processors to generate, at the first network node, a test data packet with a label to be sent along each of multiple paths in the network between the first network node and a last network node, forward the test data packet from the first network node, along each of the one or more intermediate nodes along each of the multiple paths, to the last network node, and perform a data plane validation process for validating packet forwarding from the first network node to the last network node based on the label. The data plane validation process may include determining if a number of the multiple paths equals to a number of packets received at the last network node.

Description of Example Embodiments

As noted above, large volumes of data can be difficult to manage and route within a network. Segment routing is one of the technologies used for routing traffic within a given network (e.g., in an IPv6 network such as an IPv6 centric data center). For example, segment routing over IPv6 (SRv6) can steer data packets through an IPv6 network using a Segment Identifier (SID) in the SR Header (SRH). A SID-List can result in multiple paths between a source node and a destination node of data packets (e.g., EMCPs). When a SID-List results in ECMPs, network nodes (also referred to as hops) can determine the next hops for the data packets typically based on a hash value of a data packet. The hash values can be determined based on source and destination IP addresses, a label, source and destination ports, next header, etc. Thus, different data packets traverse different end-to-end ECMPs based on the content of the data packets. In case of MPLS data plane (with or without segment routing), the hash values can be determined based on the Entropy label value or based on all the labels in the label stack of the MPLS header.

The 128-bit IPv6 SIDs in a SID-List may be compressed to smaller size SIDs (often called Compressed SIDs—CSIDs or Micro-SIDs—uSIDs), for example, 16-bit or 32-bit value and added them in a series in a 128-bit IPv6 destination address for routing a packet through nodes identified in the SID-List.

Before steering data packets using a SID-List, the SID-List may be validated. When validating a SID-List, each end-to-end ECMP of the SID-List may be validated. Validation of an end-to-end ECMP can ensure links (between hops/nodes) on the end-to-end ECMP are operational, can ensure each hop on the end-to-end ECMP correctly forwards data packets with the SID-List, and can ensure reachability of the destination node via the end-to-end ECMP using the SID-List. Validation of a SID-List can be performed by sending test packets with the SID-List via all end-to-end ECMPs, and confirming that the test packets can reach the destination node. Thus, a label may be one of the parameters that can be modified for steering test packets along a particular end-to-end ECMP so that the SID-List can be validated based on the label.

However, since there can be millions of labels (e.g., flow labels) (having 20 bits), forwarding test packets with every possible label can be inefficient and impractical. Current methods such as traceroute and ping may be used for validating ECMPs by specifying a label. According to these methods, a user has to randomly select labels and test until every ECMP is tested. This method is not deterministic due to the random nature of the label selection. If any of the ECMPs has node(s) or link(s) that are not in the headend node's topology database due to static configurations or a failure, etc., such ECMP may be missed and therefore not tested. Another available method is MPLS LSP tree trace, which is not applicable for the SRv6 data plane. Also, the MPLS LSP tree trace cannot be used for end-to-end performance measurement (PM) liveness detection and end-to-end delay measurement due to hop-by-hop (i.e., node-by-node) request and/or reply process.

Furthermore, when the number of next-hops (i.e., subsequent nodes) available at a node for a SID-List changes (e.g., a next-hop that is down coming up), a set of end-to-end ECMPs may change. The new set of end-to-end ECMPs must be validated instantly as data packets would traverse the ECMPs as soon as they are available. However, existing data plane validation mechanisms cannot begin to validate multiple paths immediately.

As described in more detail below, the present disclosure provides systems, methods and computer-readable media for deterministically measuring end-to-end performance and validating data planes with ECMPs, in a near-instantaneous manner. In some examples, a special flow label (e.g., an entropy label) that is referred to as the wildcard flow label may be defined. Each node forwards a received test packet with a label (e.g., special flow label, flow label, entropy label, wildcard flow label) to all the ECMP next-hops available for a destination address identified in the packet. The label can carry either the total number of end-to-end ECMPs if already known or record the information from the intermediate nodes to calculate the total number of end-to-end ECMPs on the fly. This number can then be used to validate the data plane. Furthermore, to validate the data plane, headend sends a test packet with the label Intermediate nodes forward the test packet to all the ECMP next-hops available for the destination address in the packet. A tail-end node receives a test packet via each end-to-end ECMP when data plane has no issue. The tail-end node then consolidates the information in the labels of the received packets, performs data plane validation and notifies the headend, accordingly. The notification may include indications of data plane failure detection, end-to-end latency values of the ECMP paths, etc.

For purposes of simplicity, the present disclosure including the above-stated problem and the following description is described in the context of SRv6 (i.e., Segment Routing over IPv6 data plane). However, the same can be applied to other data planes such as SR MPLS, IPv4, and IPv6 data planes. In addition, the same can be applied to the IP routing with MPLS, IPv4 and IPv6 data planes.

Figure 2:
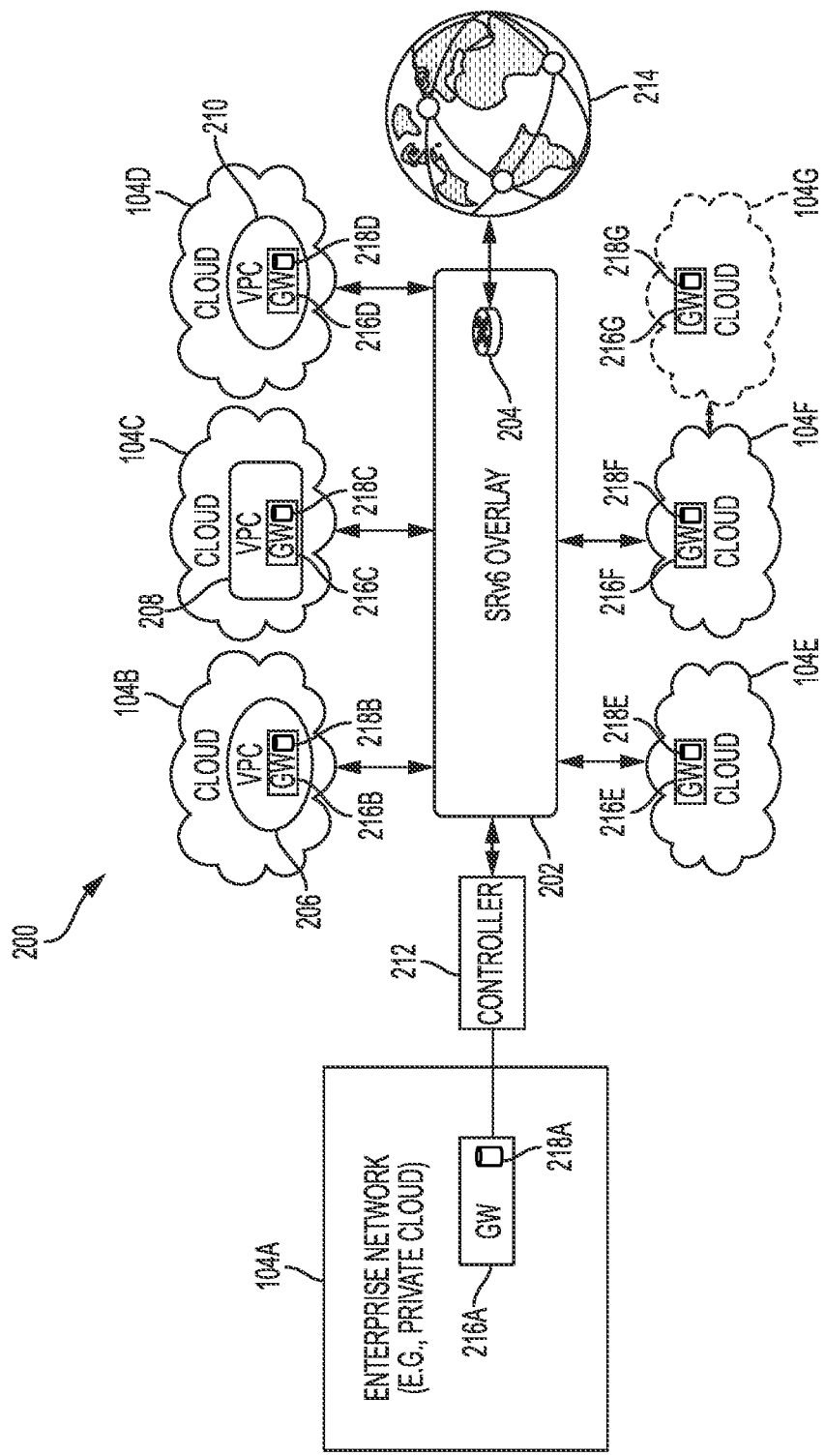
FIG. 2 illustrates a diagram of an example multi-cloud environment with an SRv6 overlay, according to some aspects of the present disclosure.
Figure 7:
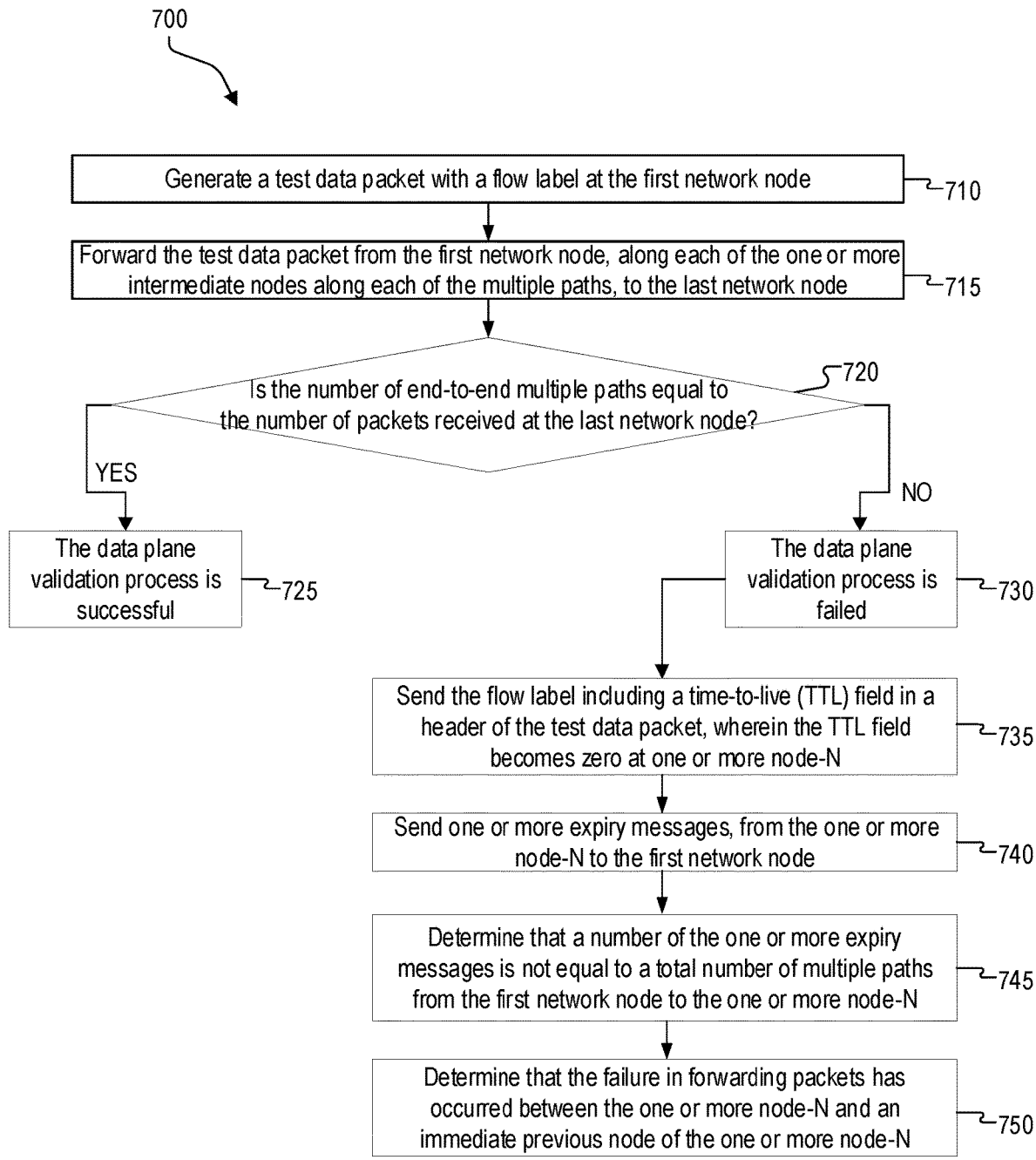
FIG. 7 illustrates a flow chart of a data plane validation process for multiple paths, according to some aspects of the present disclosure.
Figure 8:
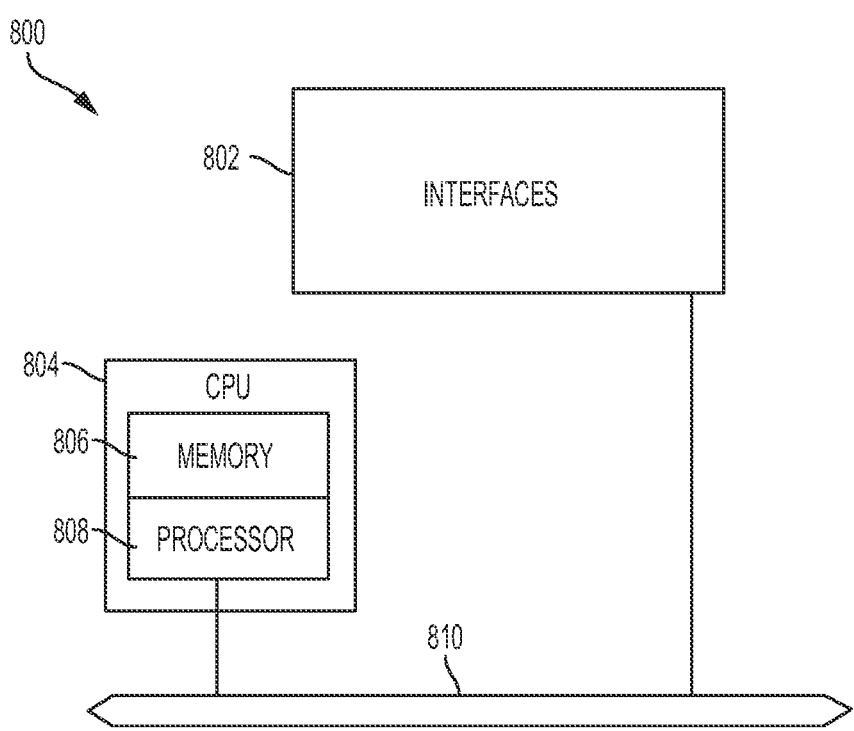
FIG. 8 illustrates an example network device, according to some aspects of the present disclosure.

The present technology will be described in the following disclosure as follows. The discussion begins with an overview of SRv6 and IPv6. A description of an example cloud data center architecture and an example multi-cloud environment with an SRv6 overlay, as illustrated in FIGS. 1 and 2, will then follow. A description of example IPv6 and SRv6 packets and their corresponding flow will then be described with reference to FIGS. 3 and 4. The present technology and the example validation processes are then described with reference to FIGS. 5 and 6. The discussion concludes with a description of an example network device and example computing devices, as illustrated in FIGS. 7 and 8, including example hardware components suitable for hosting software applications and performing computing operations. The disclosure now turns to an overview discussion of IPv6 and SRv6.

The approaches herein can utilize segment routing (SR) to steer connection or communication requests between two network nodes such as servers or nodes on different clouds or cloud regions. IPv6 and SR, which are further described below, can be used to steer requests efficiently while limiting state information. The request will be routed to the nodes identified in the SR packet based on the IPv6 and SRv6 headers. The IPv6 header can include a Source Address (SA) and a Destination Address (DA), such as a destination server or node. An SR Header (SRH) can include a SID-List of SR nodes (e.g., S1, S2, S3, etc.) and a Segment Left (SL) counter which identifies the number of remaining destination servers or nodes.

IPv6 Environment

In an IPv6 environment, such as an IPv6-centric data center, network nodes (e.g., servers) can be reached via an IPv6 physical prefix. For example, servers can run application services in isolated environments, such as virtual machines (VMs) or software containers, which can be assigned an IPv6 virtual address (VIP). In some cases, a virtual switch (e.g., Open vSwitch, vector packet processing, etc.) can be deployed on a server to route packets between physical and virtual interfaces on the server. This allows the network (e.g., data center) to be fully Layer-3 routed, without having to deploy Layer-2 tunnels such as VLANs or VXLANs.

Routing the VIPs corresponding to the different applications running in the data center can be achieved in several manners. In some examples, the virtual switches can run Interior Gateway Protocol (IGP) to propagate direct routes to the VIPs. Other examples may use a mobility protocol, such as Identifier-Locator Addressing for IPv6, wherein edge routers perform the translation between physical and virtual addresses. Moreover, network devices can use Border Gateway Protocol (BGP) to exchange routing information. As will be further explained below, the approaches herein implement segment routing to establish and manage the connectivity between clouds.

Segment Routing (SR)

SR is a source-routing paradigm, initially designed for traffic engineering, which allows for a packet to follow a predefined path, defined by a list of segments (a SID-List), inside an SR domain. The approaches herein leverage an SRv6 architecture and IPv6 connectivity to efficiently create and manage multi-cloud connectivity.

SRv6 and IPv6 can be leveraged together by implementing an IPv6 and SRv6 header in an IPv6 packet. For example, in some cases, an IPv6 extension header can be implemented to identify a list of segments for SR and a counter Segments Left, indicating the number of remaining segments to be processed until the final destination of the packet is reached. In an SRv6 packet, the IPv6 destination address can be overwritten with the address of the next segment. This way, the packet can go through SR-capable routers until reaching the next intended SR hop. Upon receipt of an SRv6 packet, an SR-capable router will set the destination address to the address of the next segment, and decrease the Segments Left counter. When the packet reaches the last SR hop, the final destination of the packet is copied to the IPv6 destination address field. Depending on the value of a flag in the header, the SRv6 header can be stripped by the last SR hop so that the destination receives a vanilla IPv6 packet.

FIG. 1 illustrates a diagram of an example cloud data center architecture, according to some aspects of the present disclosure. Architecture 100 can be implemented by one or more clouds in a multi-cloud environment. Architecture 100 is an example of a network in which SRv6 and IPv6 can be leveraged. However, the present disclosure is not limited thereto and can be applied to any other type of known or to be developed network in which SRv6 and IPv6 can be leveraged.

The cloud data center architecture 100 can include a cloud 104, which can be a private cloud, a public cloud, a hybrid cloud, a virtual private cloud (VPC), a cloud region, etc. The cloud 104 can host one or more data centers and/or networks. For example, the cloud 104 can include a single data center or a plurality of data centers. The cloud 104 can be physically located in one geographic location or distributed throughout multiple geographic locations. Moreover, the cloud 104 can include forwarder-side and server-side architectures or components.

The cloud 104 switches 106-1 through 106-N (collectively "106" hereinafter) and 108-1 through 108-N (collectively "108" hereinafter) configured to route traffic in the cloud data center architecture 100. The switches 106, 108 can include any network device with layer 2 (L2) and/or layer 3 (L3) capabilities. In this example, the switches 106 represent spine switches and the switches 108 represent leaf switches.

The client 102 can connect to the cloud 104 and access application servers 110-1 through 110-N (collectively "110" hereinafter) via the switches 106, 108. The client 102 can be a network, such as a cloud network or data center (e.g., a private cloud, a public cloud, a hybrid cloud, a cloud region or segment, a virtual private cloud, etc.), or any computing device, such as a laptop, a desktop, a tablet computer, a mobile phone, a server, a smart device (e.g., smart television, smart watch, etc.), an internet of things (IoT) device, etc.

The switches 106 can serve as edge devices in the cloud 104, and route traffic to and from the cloud 104. The switches 106 can thus serve as the egress and ingress point for the cloud 104. The switches 106 can also route traffic to the switches 108 in the cloud 104, which can route traffic to other nodes (e.g., appliances, firewalls, load balancers, etc.) and application servers 110 in the cloud 104.

The application servers 110 can represent physical machines and/or resources hosting applications, isolated environments, or services in the cloud 104. For example, the application servers 110 can be physical servers running various applications in the cloud 104. The application servers 110 can run some or all of their applications in isolated environments, such as VMs or software containers. In some cases, an application can by hosted by, and/or run on, multiple application servers 110 in the cloud 104. For example, multiple application servers 110 can run instances of an application (e.g., virtual instances, replicas, parallel instances, mirror instances, etc.).

The application servers 110 can include a physical network interface (e.g., NIC) to communicate with other devices or services (e.g., devices or services in the cloud data center architecture 100). The physical network interface can be assigned a physical prefix or network address for such communications. The application servers 110 can also include one or more virtual interfaces (e.g., vNICs) which can provide virtualized or abstract representations of network interfaces and connections. Virtual interfaces can provide added flexibility and network capabilities, as well as various other benefits or services, such as aggregation of links or data, isolation of data or networks, decoupling of application and system traffic, expansion of network interfaces, network redundancy, dedicated links, and so forth. Virtual interfaces can be assigned virtual addresses (e.g., VIPs) in the cloud 104. The virtual addresses can identify the virtual interfaces as well as any applications or isolated environments associated with the virtual addresses on the application servers 110.

For example, an application can be assigned a virtual address in the cloud 104, which can be used to identify the application in the cloud 104 and route traffic to and from the application. The virtual address can be used to steer traffic to and from a virtual instance of the application running on one or more of the application servers 110. In some cases, the virtual address can be mapped to the same application on multiple application servers 110, and can be used to communicate with an instance of the application on any of the multiple application servers 110.

In some cases, the application servers 110 can include a virtual switch, such as OVS or VPP, which can route traffic to and from the application servers 110. For example, a virtual switch can route traffic between physical and virtual network interfaces on an application server, between applications and/or isolated environments on the application server, and between the application server and devices or applications outside of the application server. To illustrate, an application server can run multiple workloads (e.g., applications in different VMs or containers) assigned to different virtual interfaces and virtual addresses. A virtual switch on the application server can route traffic to and from the different workloads by translating the virtual addresses of the workloads and communicating with the virtual interfaces as well as other network interfaces such as the physical network interface(s) on the application server.

FIG. 2 illustrates a diagram of an example multi-cloud environment with an SRv6 overlay, according to some aspects of the present disclosure. The multi-cloud environment 200 includes clouds 104A-G interconnected through an SRv6 overlay 202 which routes traffic between the clouds 104A-G using SRv6. In this example, cloud 104A represents a private cloud or site, and clouds 104B-G represent public clouds. Moreover, the clouds 104B, 104C, 104D include virtual private clouds (VPCs) 206, 208, 210 configured for cloud 104A and hosted by the clouds 104B, 104C, 104D. Clouds 104E-G, as illustrated in this example, do not include VPCs associated with cloud 104A. However, as described below, the approaches herein can allow VPCs to be created for cloud 104A on any of the clouds 104E-G.

A controller 212 can interact with gateways 216A-G on clouds 104A-G to collect topology information, perform path computation, propagate routes across the clouds 104A-G and/or VPCs 206-210, propagate segment routing identifiers (SIDs) and policies across the clouds 104A-G and/or VPCs 206-210, perform traffic engineering, etc. The controller 212 can be, for example, a BGP controller with a path computation engine. The controller 212 can reside on cloud 104A or any other network or cloud. The gateways 216A-G can be, for example, virtual gateways available at the clouds 104A-G. In some cases, the virtual gateways can include a vector packet processing engine (VPP).

The controller 212 can collect topology information from the clouds 104A-G and/or VPCs 206-210 and propagate forwarding rules and SR IDs (e.g., SIDs) and SR policies using one or more protocols such as OSPF (Open Shortest Path First), IS-IS (Intermediate System to Intermediate System), BGP Link-State (BGP-LS), BGP Traffic Engineering (BGP-TE), etc. For example, the controller 212 can collect topology information for the clouds 104A-G and/or VPCs 206-210 from gateways 216A-G using BGP-LS protocol. The controller 212 can also include a path computation engine (PCE) for computing the best paths between the gateways 216A-G. The controller 212 can use the collected topology and/or cloud information to perform the path computation. The controller 212 can then use BGP-TE to populate reachability information, such as forwarding rules and SR IDs and SR policies, on the gateways 216A-G.

The gateways 216A-G can include a control plane that interfaces with BGP-LS and BGP-TE to receive the forwarding rules and SR IDs policies from the controller 212. The gateways 216A-G can also include a data plane that processes IPv4 and/or IPv6 packets and is able to encapsulate/decapsulate IPv4 or IPv6 packets into SRv6 packets. Moreover, the gateways 216A-G can include BGP agents 218A-G, such as GoBGP agents, to interact with the controller 212 or any BGP peers. In some cases, the gateways 216A-G can also include an active measurement system based on IP SLA (Internet Protocol Service Level Agreement) to collect network performance information including delay and packet loss and monitor quality-of-service (QoS) between the gateways 216A-G.

The controller 212 can communicate with the clouds 104A-G via IPv4 or IPv6. The SRv6 overlay 202 can include SRv6-capable nodes that can route traffic over the SRv6 overlay 202 using SRv6, as further explained below.

Figure 3A:
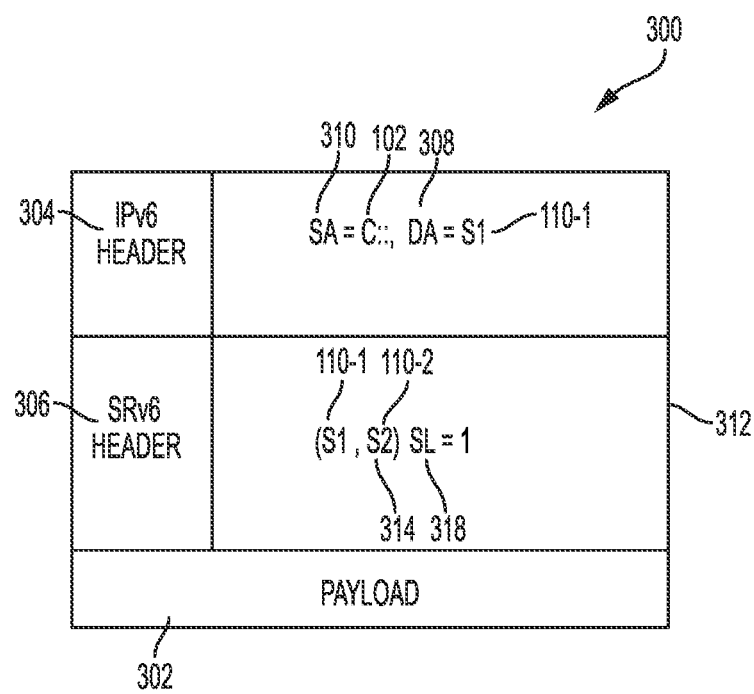
FIG. 3A illustrates an example IPv6 and SRv6 packet, according to some aspects of the present disclosure.

FIG. 3A illustrates an example SRv6 packet, according to some aspects of the present disclosure. SRv6 packet 300 for traffic routed via the SRv6 overlay 202. The SRv6 packet 300 includes a payload 302, an IPv6 header 304, and an SR header 306. The SR header 306 can include a segments field 312 containing a list of segments 314 or SR list. The list of segments 314 can include a set of destination nodes for the SRv6 packet 300. For example, the list of segments 314 can include application server 110-1 (S1) and application server 110-2 (S2) from the cloud 104 shown in FIG. 1. The destination nodes in the list of segments 314 can reside on one cloud (e.g., 104) or multiple clouds (e.g., 104A-G). The list of segments 314 can also include a respective function for each segment, as further described below with reference to FIG. 3B.

The list of segments 314 in the SR header 306 can be used by nodes in the SRv6 overlay 202 to steer the packet 300 to the destination nodes (e.g., application servers 110-1 and 110-2) in the list of segments 314. The list of segments 314 identifies each segment (e.g., SRv6-capable node) along a path for the packet. Each SRv6-capable node can maintain a list of SRv6 segments instantiated at the node. The SRv6-capable node can use its list of SRv6 segments to route the packet to the next segment in the list of segments 314.

The segments field 312 can also include a counter 318, known as the Segments Left, which identifies the active segment. The value of the counter 318 is decreased by 1 each time it is received by an SRv6-capable node as the packet travels through the IPv6 network.

The IPv6 header 304 can include a source address field 310 and a destination address field 308. The source address field 310 can identify the source of the packet 300, such as client 102. The source address field 310 can include a network address of the original source of the packet 300, a return destination for the packet 300, and/or a current source or sender of the packet 300. The source field 310 can also include commands or functions to be implemented by the node identified in the source field 310, as will be further described below.

The destination address field 308 can identify the next segment or node from the list of segments 314. In this example, the destination address field 308 identifies server 110-1 (S1) which is the first destination node in the list of segments 314 for the packet 300. The destination address field 308 can be used to steer the packet 300 to the next destination. The destination field 308 in the IPv6 header 304 can allow the packet 300 to be routed even if the packet 300 traverses SR-unaware nodes.

The destination address field 308 can include a network prefix of the identified node or segment. For example, the destination address field 308 can include the physical prefix of server 110-1 (S1). This can ensure that the packet 300 is transmitted to that node or segment (e.g., server 110-1 (S1)), as the first destination for the packet 300. After the server 110-1 (S1) processes the packet 300, the server 110-1 (S1) can forward the packet 300 to the next segment in the list of segments 314, which in this example is server 110-2 (S2). When forwarding the packet, the server 110-1 (S1) can overwrite the destination address field 308 on the IPv6 header 304 to identify the server 110-2 (S2) as the destination, which ensures that the packet 300 is routed to server 110-2 (S2). Server 110-2 (S2) can then receive the packet 300 based on the destination address field 308. This way, the list of segments 314 in the SR header 306 as well as the destination address field 308 in the IPv6 header 304 can be used to push the packet 300 to the destination nodes in the list of segments 314.

As will be further explained, the list of segments 314 and/or destination address field 308 can include functions or commands (hereinafter "SR functions") to be implemented by associated nodes or segments. For example, the destination address field 308 can identify application server 110-1 (S1) and include a function to be applied by application server 110-1 (S1), such as a connect function which application server 110-1 (S1) can interpret as a request to connect with an application or node associated with the function. The destination address field 308 can contain the state of the packet 300, including the next destination of the packet, the source or return node, and any commands or functions for such nodes or segments.

Similarly, the list of segments 314 can include commands or functions for the segments in the list of segments 314. For example, the list of segments 314 can include a connect function for each of the destination node or segment, a force connect function for the last segment in the list of segments 314, one or more parameters for one or more segments (e.g., resource identifier, flow identifier, etc.), state information, and so forth.

SR functions can encode actions to be taken by a node directly in the SR header 306 and/or the IPv6 header 304. SR functions are executed locally by the SRv6-capable nodes. Example SR functions include, without limitation, End (i.e., endpoint function), End.X (i.e., endpoint function with Layer-3 cross-connect), End.T (i.e., endpoint function with specific IPv6 table lookup), End.S (i.e., endpoint in search of a target in table T), End.B6 (i.e., endpoint bound to an SRv6 policy), etc. For example, in an SR header (306) containing s:cj, s:cj denotes the shortest-path to the node s and an x-connect function (function c) to the neighbor j.

In some examples, each node can be assigned an entire IPv6 prefix. Accordingly, the lower-order bytes in the prefix can be used to designate different SR functions. In some cases, the SR functions may depend on the address of the first segment in the list of segments 314 (e.g., the "sender" of the function). To illustrate, when a node whose physical prefix is s receives a packet with the SR header 306 containing (x, . . . , s:f, . . . ), the SR header 306 will trigger node s to perform a function f with argument x, denoted by s.f(x).

Figure 3B:
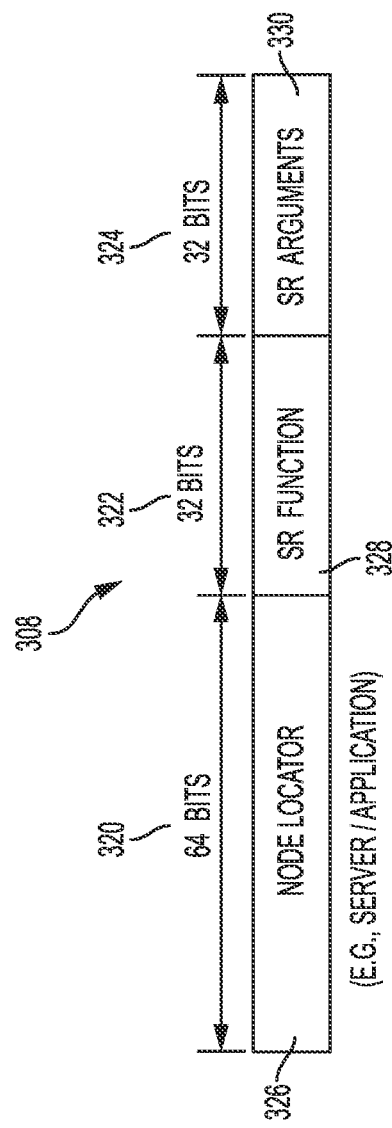
FIG. 3B illustrates a schematic diagram of an example destination field in an IPv6 and SRv6 header, according to some aspects of the present disclosure.

FIG. 3B illustrates a schematic diagram of an example destination address field in an IPv6 header, according to some aspects of the present disclosure. Destination address field 308 can include 128 bits, which can be segmented to include a first segment 320 from the first 64 bits for the node prefix 326, a second segment 322 from the next 32 bits for an SR function 328, and a third segment 324 from the next 32 bits to include any arguments 330 for the SR function 328. While this example illustrates the destination address field 308 segmented into a segment of 64 bits, a segment of 32 bits, and a segment of 32 bits, it should be noted that the destination address field 308 allows for flexible bit selection and thus can be segmented in other ways. The example in FIG. 3B is provided for illustration and explanation purposes.

The node prefix 326 can include the physical prefix of the next segment or node. The SR function 328 can include a command or function associated with the node prefix 326. In some cases, the third segment 324 can be further segmented into sub-segments which can include arguments for the SR function 328. The arguments can be used to pass specific parameters for the SR function 328.

Figure 3C:
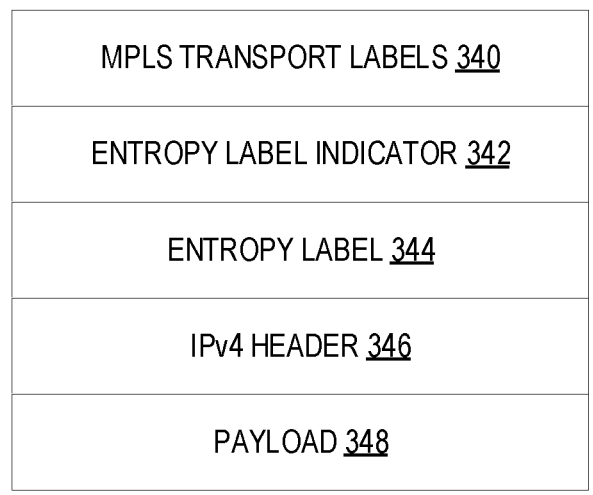
FIG. 3C illustrates an example Multiprotocol Label Switching (MPLS) entropy label, according to some aspects of the present disclosure.

FIG. 3C illustrates an example Multiprotocol Label Switching (MPLS) label stack, according to some aspects of the present disclosure. MPLS label stack 300 includes MPLS transport label(s) 340, entropy label indicator 342, entropy label 344, IPv4 (or IPv6) header 346, and payload 348.

Figure 4:
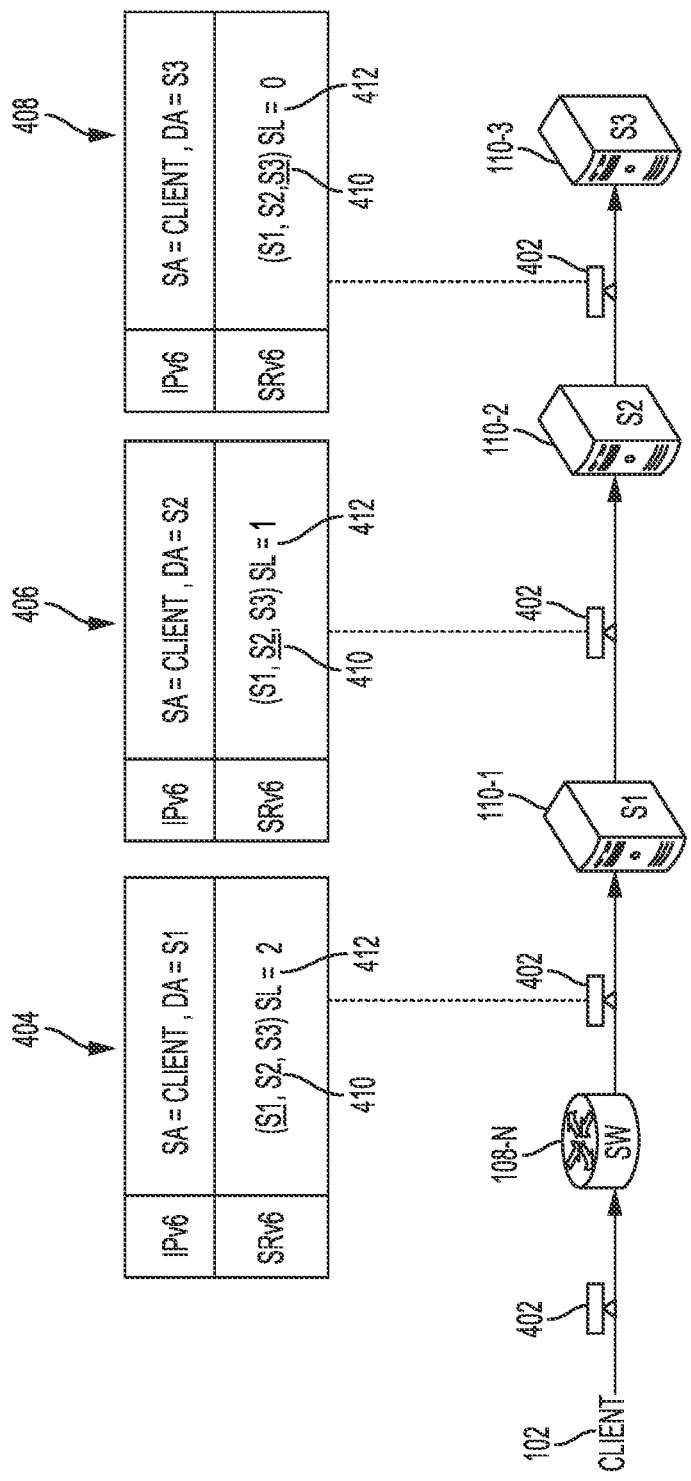
FIG. 4 illustrates an example flow of SRv6 traffic, according to some aspects of the present disclosure.

FIG. 4 illustrates an example flow of SRv6 traffic, according to some aspects of the present disclosure. FIG. 4 illustrates an example flow of SRv6 traffic (e.g., SRv6 packet 300) based on corresponding IPv6 and SRv6 headers 404, 406, 408. In this example, a client 102 sends a packet 402 to switch 108-N. The packet 402 can identify the client 102 as the source (can be referred to as a source node) and a destination address for the traffic (can be referred to as a destination node).

The switch 108-N can receive the packet 402 and forward the packet to application server 110-1 (S1) based on the IPv6 and SRv6 headers 404. The SRv6 header in the headers 404 can include a list of segments (a SID-List) 410 identifying application servers 110-1, 110-2, 110-3 as the destination segments. The SRv6 header can in the headers 404 can also include a Segments Left (SL) counter 412 identifying the number of remaining segments or hops in the list of segments 410.

The application server 110-1 (S1) can receive the packet 402 from the switch 108-N and process it. The application server 110-1 (S1) can then forward the packet 402 to application server 110-2 (S2), which is the next segment in the list of segments 410, based on the list of segments 410 in the headers 406. The application server 110-1 (S1) can also decrease the SL counter 412 identifying the number of remaining segments or hops in the list of segments 410.

The application server 110-2 (S2) can receive the packet 402 from the application server 110-1 (S1) and process it. The application server 110-2 (S2) can then forward the packet 402 to application server 110-3 (S3), which is the next segment in the list of segments 410, based on the list of segments 410 in the headers 408. The application server 110-2 (S2) can also decrease the SL counter 412 identifying the number of remaining segments or hops in the list of segments 410.

The application server 110-3 (S3) can receive the packet 402 from the application server 110-2 (S2) and process it. The application server 110-3 (S3) is the last segment in the list of segments 410. Accordingly, the application server 110-3 (S3) can decrease the SL counter 412 identifying the number of remaining segments or hops in the list of segments 410, without forwarding the packet to another destination segment.

With example networks and flow of SRv6/IPv6 packets described above with reference to FIGS. 1-4, the disclosure now turns to systems and techniques for validating multiple paths (e.g., ECMPs) between a source node and a destination node over a data plane.

Figure 5:
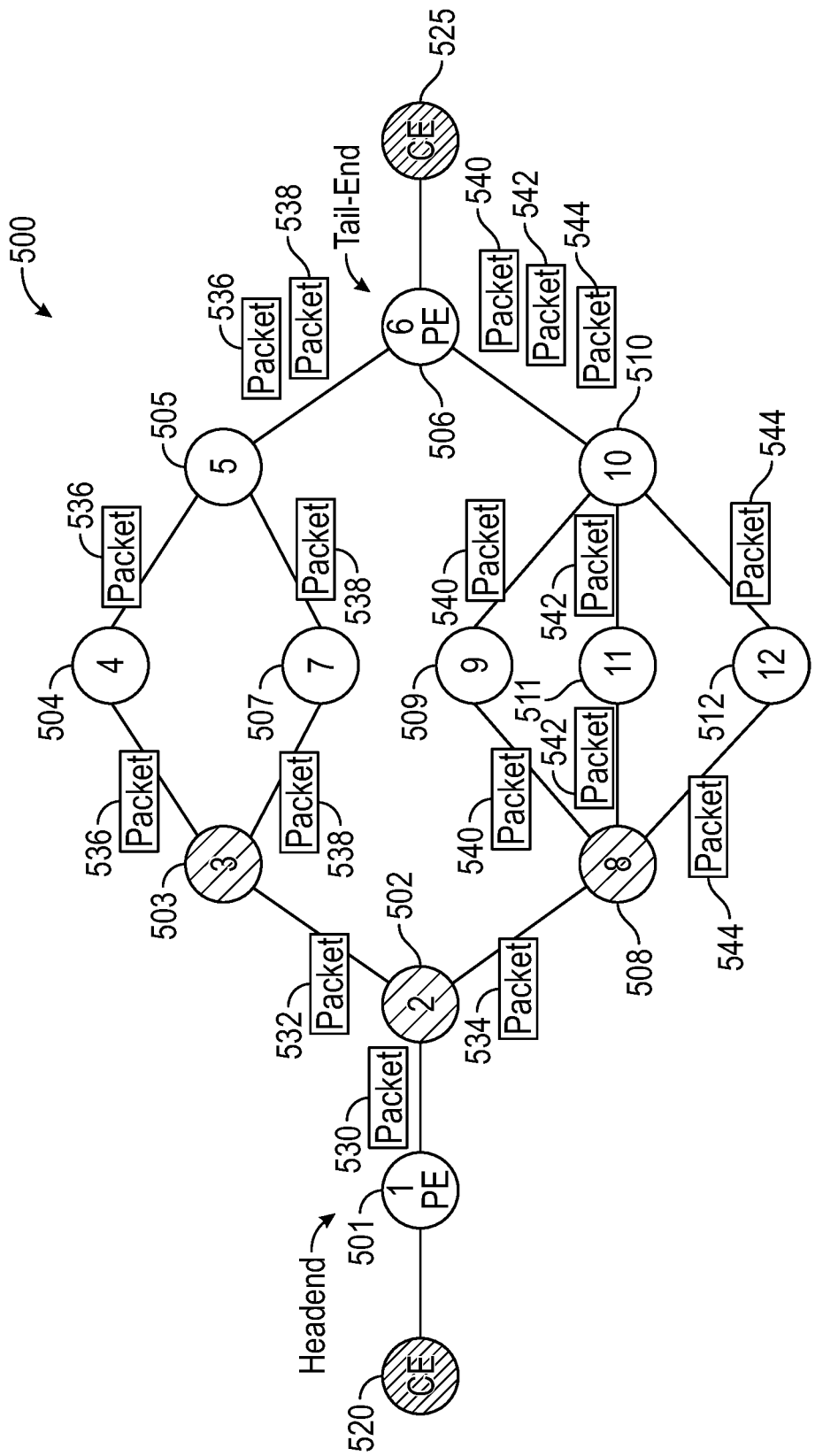
FIG. 5 illustrates an example network system for validating multiple paths for packet forwarding in a network, according to some aspects of the present disclosure.

FIG. 5 illustrates a non-limiting example network system 500 for validating multiple paths for packet forwarding in a segment routing network, according to some aspects of the present disclosure. As shown, node 520 can be a source node (e.g., a user terminal, a server, etc.) with data traffic to be forwarded to node 525, which can be a destination node (e.g., a different user terminal, a different server, etc.). Nodes 501-512 can be network elements (e.g., switches, routers, or any suitable communications processing device such as switches 106-N and 108-N described with reference to FIGS. 1 and 4 above or SRv6-capable node described with reference to FIG. 3A above) that use segment routing for carrying network traffic and corresponding data packet(s) from source node 520 to destination node 525. Each of nodes 501-512 may be referred to as a hop. Node 501 may be referred to as a headend node/hop. Nodes 502-505 and 507-512 may be referred to as intermediate nodes/hops that forward data packet(s) from the previous node(s) to its subsequent node(s). Node 506 may be referred to as a tail-end node/hop.

According to some examples, each of nodes 501-512 including the headend node, intermediate nodes, and tail-end node can be a router for segment routing (SR) that routes data plane traffic of at least one of MPLS, SR MPLS, IPv4, or IPv6 network. For purposes of simplicity, the present disclosure is described in the context of SRv6 (i.e., Segment Routing over IPv6 data plane) with respect to FIGS. 5-7. However, the present disclosure can be equally applicable in other data planes such as in MPLS, IPv4, or IPv6 network with or without segment routing. In another aspect, each of the first network node, the last network node, and the one or more intermediate nodes is a router for IP routing. Also, IP routing is routing data plane traffic of at least one of Multi-Protocol Label Switching (MPLS), IPv4, or IPv6 network.

In some examples, source node 520 and destination node 525 may be a client edge node while headend node 501 and tail-end node 506 may be a provider edge node where customer traffic comes from source node 520 (e.g., client edge node) to node 501 (e.g., provider edge node).

Referring to FIG. 5, the data plane validation process described in FIG. 5 pertains to validating a data plane from headend node 501 to tail-end node 506 for SID-List of <S6> where S6 is the node SID of tail-end node 506. To validate the data plane for a given SID-List, headend node 501 may send a test data packet (e.g., packet 530) with a label and a sequence number. Then, each of intermediate nodes 502-505 and 507-512 may forward the test data packet to all the next nodes (i.e., hops) available for the next SID in the received packet. The SID-List may identify nodes that may form one or more multiple paths that will be traversed by packets originating from node 520 and destined for node 525.

In the non-limiting example network system 500 of FIG. 5, the total number of end-to-end multiple paths (ECMPs) is five. For example, five example multiple paths (e.g., ECMPs) include path (1) formed by nodes 502-506; path (2) formed by nodes 502, 503, 507, 505, and 506; path (3) formed by nodes 502, 508-510, and 506; path (4) formed by nodes 502, 508, 511, 510, and 506; and path (5) formed by nodes 502, 508, 512, 510, and 506.

The data packet (e.g., packet 530) originated from headend node 501 may traverse each of the five multiple paths, all of which converge at tail-end node 506. For example, headend node 501 sends packet 530 to its subsequent node 502, which then forwards packets 532 and 534 to each of its subsequent nodes 503 and 508, respectively. Node 503 then forwards packets 536 and 538 to its subsequent nodes 504 and 507, respectively. Nodes 504 and 507 forwards packets 536 and 538, respectively to their subsequent node 505. Node 505 then forwards packets 536 and 538 to its subsequent node, tail-end node 506. Similarly, node 508 forwards packets 540, 542, and 544 to its subsequent nodes 509, 511, and 512, which then forward packets 540, 542, and 544, respectively to their subsequent node 510. Node 510 then forwards packets 540, 542, and 544 to its subsequent node, tail-end node 506. As a result, tail-end node 506 receives five packets 536, 538, 540, 542, and 544 that have traversed along five paths (1)-(5) from its previous nodes 505 and 510.

In some examples, the data plane validation process includes determining if the total number of end-to-end multiple paths is equal to the number of packets received at the last network node (e.g., tail-end node 506 in FIG. 5) based on the label and sequence number included in the packets that traverse the multiple paths. If the number of end-to-end multiple paths for the SID-List being tested is the same as the number of packets received at the tail-end node 506, the data plane validation process is determined to have been successful (i.e., the data plane is validated for packet forwarding on multiple paths). If not, the data plane validation process is determined to have been failed. For example, in FIG. 5, tail-end node 506 receives five packets 536, 538, 540, 542, and 544 that have traversed along five paths (1)-(5) from its previous nodes 505 and 510. As such, the data plane validation process is determined to have been successful, which shows that all the multiple paths, ECMPs have been validated.

The data plane validation process according to some aspects of the present disclosure can be applied to various cases including, but not limited to a performance measurement (PM) liveness monitoring for connectivity verification, end-to-end PM delay and jitter measurement, end-to-end PM packet loss measurement, and Operations, Administration, and Management (OAM) application.

According to some examples, in the PM liveness detection, the data plane validation process can be performed by a headend node (e.g., headend node 501 in FIG. 5). For example, the headend node may send a packet with a label (e.g., packet 530 in FIG. 5). Intermediate nodes forward the packet to all the end-to-end ECMPs. The packets eventually reach the headend node (e.g., headend node 501 in FIG. 5), after traversing end-to-end ECMPs via intermediate nodes (e.g., nodes 502-505 and 507-512 in FIG. 5) and tail-end node (e.g., tail-end node 506 in FIG. 5).

In some examples, in the case of PM delay and jitter measurement, a headend node sends a packet with a label (e.g., entropy label for MPLS or wildcard flow label). Intermediate nodes may forward the packet to all the end-to-end ECMPs. The packets forwarded along the intermediate nodes on each of the ECMPs may reach the tail-end node. Then, the tail-end node may calculate one-way delay values for end-to-end ECMPs. These delay values can then be accessed via telemetry, or the metrics derived from the delays (e.g., average, minimum, or maximum delays and jitter/variance over all end-to-end ECMPs) can be sent to the headend node (e.g., headend node 501 in FIG. 5).

In some examples, in the case of PM packet loss measurement, a headend node sends a packet with a label. Intermediate nodes may forward the packet to all the end-to-end ECMPs. The packets forwarded along the intermediate nodes on each of the ECMPs may reach the tail-end node. Then, the tail-end node may calculate packet loss values for end-to-end ECMPs. These loss values can then be accessed via telemetry, or the metrics derived from the packet loss (e.g., over all end-to-end ECMPs) can be sent to the headend node (e.g., headend node 501 in FIG. 5).

In the OAM application, the data plane validation process can be performed by a tail-end node (e.g., tail-end node 506 in FIG. 5). For example, in a network where the number of end-to-end ECMPs for the SID-List being tested is N (in FIG. 5, N=5), if a headend node receives N number of test packets with the same sequence number, the data plane validation is successful in PM liveness detection loopback mode. For example, if a tail-end node receives an N number of test packets with the same sequence number, the data plane validation is successful. Furthermore, the tail-end node may subsequently send the headend node a single reply message with the results of the data plane validation process.

In some instances, the total number of packets to be received at the tail-end node can be determined based on the label included in the test data packets. The label can include either a total number of packets to be received at the last network node or information to calculate the same. For example, a format of the label can be as described below:

```
+-+-+-+-+-+-+-+-+-+-+-+-+-+-+-+-+-+-+-+-+-+-+-+-+-+-+-+-+-+-+
|W|T|L| Total number of packets or information to calculate it |
+-+-+-+-+-+-+-+-+-+-+-+-+-+-+-+-+-+-+-+-+-+-+-+-+-+-+-+-+-+-+
```

The "W flag" (1 bit) denotes a wildcard flag. If the W flag is set, the test data packet can be forwarded to all the subsequent nodes (or hops) available for the next SID in the segment list. The "T flag" (1 bit) denotes the total number of packet flags. When the T flag is set, a label includes a total number of packets to be received at the headend node or the tail-end node to validate the data plane. However, if the T flag is not set, the total number of packets can be calculated based on the information received from each of the nodes on end-to-end ECMPs. The "L flag" (1 bit) denotes a Layer 2 ECMP test flag. When the L flag is set, layer 2 ECMPs can be tested.

When the T flag is set, the label can be described as:

```
+-+-+-+-+-+-+-+-+-+-+-+-+-+-+-+-+-+-+-+-+-+-+-+-+-+-+-+-+-+-+
|W|T|L|           Total Number of Packets                    |
+-+-+-+-+-+-+-+-+-+-+-+-+-+-+-+-+-+-+-+-+-+-+-+-+-+-+-+-+-+-+
```

In case where the T flag is set as above and the label includes the total number of packets, the data plane validation can be performed by a headend node or a path computation element (PCE) or a network controller based on the label.

In some examples, the headend node (e.g., headend node 501) may send a test data packet with the SID-List, a sequence number, and a label with W and T flags set where the label may contain the total number of end-to-end ECMPs. According to some examples, to validate the data plane in this case, the number of test data packets received by the headend node or the tail-end node should be equal to the total number of end-to-end ECMPs. Each intermediate node may simply forward the received test packet, without modifying the label therein, to subsequent nodes/hops for the SID-List.

For example, in the example network system 500 as shown in FIG. 5, if packet 530, which is generated at the headend node 501 includes the total number of packets in the label (i.e., set values for the W and T flags), then each of intermediate nodes 502-505 and 507-512 may forward packet 530, without modifying the label therein, to the tail-end node 506. Headend node 501, PCE (not shown in FIG. 5), or a network controller (not shown in FIG. 5) may determine the total number of packets to be included in the label by determining the total number of end-to-end ECMPs based on the network. Since packet 530 is not modified by any of the intermediate nodes, packets 532-544, which traverse along the multiple paths, may be the same as packet 530.

On the other hand, when W flag is set and the T flag is not set, the label can be described as:

```
+-+-+-+-+-+-+-+-+-+-+-+-+-+-+-+-+-+-+-+-+-+-+-+-+-+-+-+-+-+-+-+-+
|W|T|L| Current ECMP Node | Information ECMP Node | Multiplier |
+-+-+-+-+-+-+-+-+-+-+-+-+-+-+-+-+-+-+-+-+-+-+-+-+-+-+-+-+-+-+-+-+
```

In case where the T flag is not set above and instead the label includes information to calculate the total number of packets, for example, Current ECMP Node (C), Information ECMP Node (I), and Multiplier (M) values, the data plane validation can be performed by either a headend node or a tail-end node based on the information included in the label.

The "Current ECMP Node" field (5-bits) denotes an ECMP level of the ECMP node that last modified the label ECMP level of an ECMP node may denote the sequential number of the ECMP node (I.e., a node that has multiple ECMP next-hops) on an end-to-end ECMP, where ECMP level of headend is zero and it increases by one for each ECMP node on an end-to-end ECMP towards tail-end. The "Information ECMP Node" field (5-bits) denotes an ECMP level of the ECMP node whose multiplier is in the label. When the "Multiplier" field is not zero, it denotes the number of next-hops (subsequent nodes) available for the segment list at the "Information ECMP Node" field.

In some examples, the headend node (e.g., headend node 501 in FIG. 5) may send a test data packet with the SID-List, a sequence number, and a label with W flag value set and T flag value cleared. In this case, the label may contain Current ECMP Node (C), Information ECMP Node (I), and Multiplier (M) fields. These three values (C, I, M) can be modified at the intermediate node(s) that have multiple next-hops (e.g., subsequent nodes or ECMP nodes). In some instances, the headend or tail-end node may consolidate the information in the labels, for example, C, I and M values, to calculate the total number of end-to-end ECMPs and to perform the data plane validation process.

Referring to FIG. 5, node 502 has two subsequent nodes 503 and 508. Then, the label included in each of the test data packets to be forwarded to nodes 503 and 508 may be modified. As a result, node 502 forwards packet 532 to node 503 and packet 534 to node 508. Also, node 503 has two subsequent nodes 504 and 507. Then, the label included in packet 536 may be modified. As a result, node 503 forwards packet 536 to node 504 and packet 538 to node 507.

In a similar fashion, node 508 has three subsequent nodes 509, 511, and 512. Then, the label included in packet 534 may be modified for each of the packets to be forwarded to nodes 509, 511, and 512. As a result, node 508 forwards packet 540 to node 509, packet 542 to node 511, and packet 544 to node 512.

On the other hand, if an intermediate node has a single subsequent node, the intermediate node forwards the packet without modifying the label therein as received from its previous node. For example, in FIG. 5, node 504 has one subsequent node, node 505. As such, node 504 forwards packet 536, as received from its previous hop, node 503 without modifying the label therein, to node 505. Similarly, node 7 forwards packet 538 without modifying the label to its single subsequent node, node 505. Since node 505 also has one subsequent node, which is tail-end node 506, it forwards both packets 536 and 538, as received from nodes 504 and 507, to node 506.

In a similar fashion, each of intermediate nodes 509, 511, and 512 forwards packets 540, 542, and 544, respectively, as received from node 508, to their single subsequent node, node 510. Similarly, node 510 forwards packets 540, 542, and 544 to its subsequent node, node 506. As such, tail-end node 506 receives, from node 510, packets 540, 542, and 544.

A non-limiting example of a pseudocode of a set of computer-readable instructions for processing labels at intermediate nodes can be described as follows. This example set of computer-readable instructions will be further described below with reference to FIG. 6.

```
Input: Flow label of the received packet
Output: Flow labels for packets that are to be forwarded to next-hops for sid-list
If node has multiple next-hops for the SID-list:
    If W flag is set in the flow label:
        If T flag is set:
            For each next-hop for the sid-list, use flow label of the received test packet
        Else:   /* T flag is not set */
            /* Flow label of the received packet is denoted by [C, I, M] */
            /* This node is at (C+1)th ECMP level and has M' number of next-hops for sid-list */
            To first next-hop, use flow label with [C+1, 1, M]
            To second next-hop, use flow label with [C+1, C+1, M']
            To remaining next-hops, use flow label with [C+1, C+1, 0]
```

Figure 6:
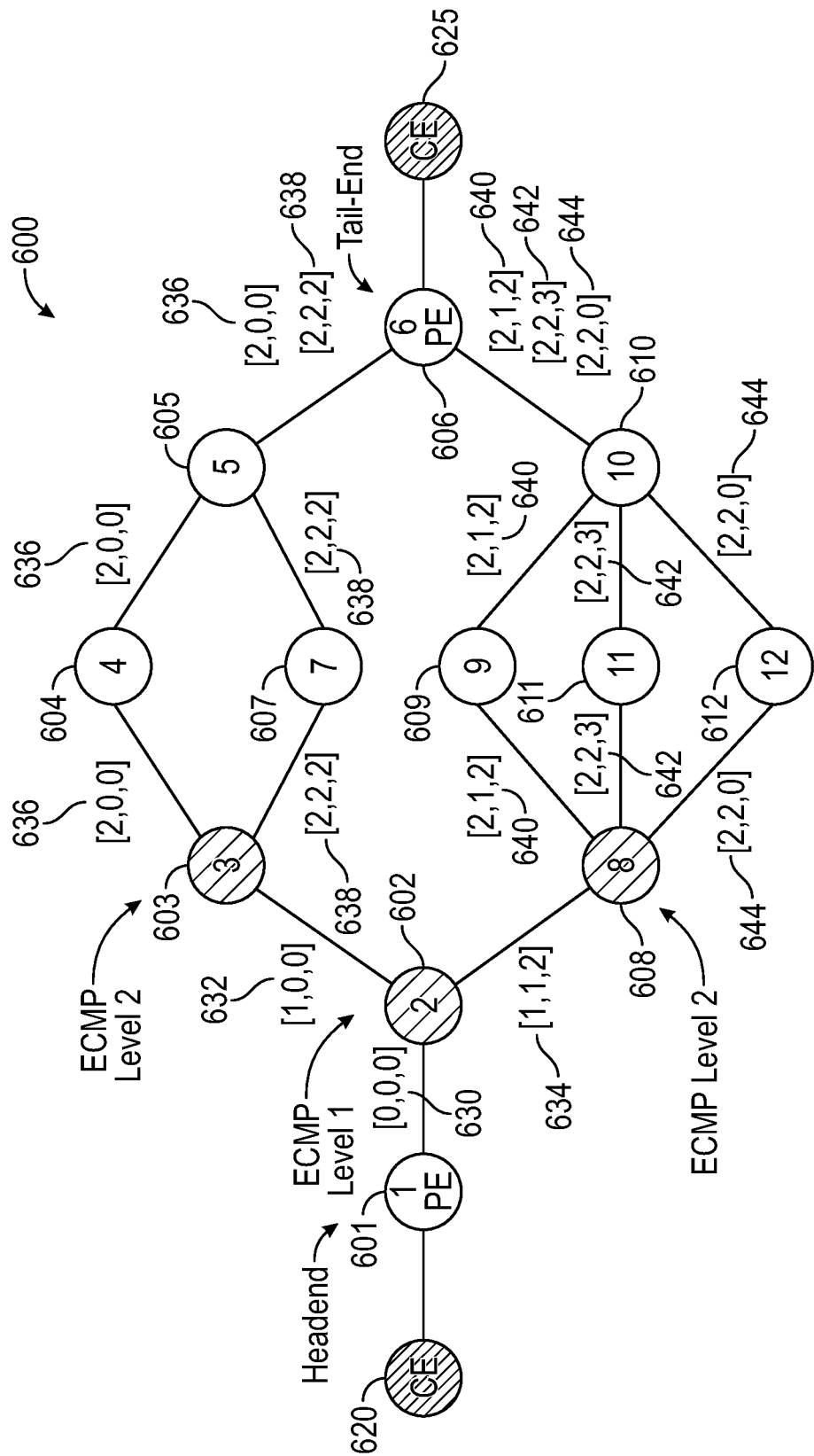
FIG. 6 illustrates another example network system for validating multiple paths for packet forwarding in a network, according to some aspects of the present disclosure.

FIG. 6 illustrates example network system 600 for validating multiple paths for packet forwarding in a segment routing network, according to some aspects of the present disclosure. The non-limiting example network system 600 describes the process of how the packets are traversed on multiple paths with modified labels. For example, example network system 600 is described with example values in the label in case the W flag is set and T flag is cleared in the label (i.e., the total number of packets to be received at the tail-end node is not provided in the label) and instead the label includes C, I, M values to help calculating the total number of packets.

Similar to FIG. 5, node 620 can be a source node (e.g., a user terminal, a server, etc.) with data traffic to be forwarded to node 625, which can be a destination node (e.g., a different user terminal, a different server, etc.). Nodes 601-612 can be network elements that use segment routing for carrying network traffic and corresponding data packet(s) from source node 620 to destination node 625.

In some examples, once customer traffic comes from source node 620 to headend node 601, a test packet is generated at headend node 601 where label 630 may be denoted in the form of [C, I, M] to validate a data plane. As previously described, the "C" field is referred to as Current ECMP Node indicating an ECMP level of the ECMP node that last modified the label. Also, the "I" field is referred to as Information ECMP Node indicating an ECMP level of the ECMP node whose multiplier is in the label. The "M" field is referred to as Multiplier indicating a number of next-hops (subsequent nodes) available for the segment list at the "I" field.

As shown in FIG. 6, initially, label 630 with [0, 0, 0] is generated at headend node 601 and forwarded to node 602. At node 602, there are two subsequent nodes (next-hops), nodes 603 and 608. As such, node 602 is at ECMP level one and has two next-hops (M' value) for SID-List. No label is modified before node 602 (i.e., no multiple paths before node 602) and therefore, the C value at node 602 is 0. For the first next-hop, label may be used with [C+1, I, M]. Therefore, node 602 may forward label 632 with [1, 0, 0] to its first next-hop, node 603. For the second next-hop, a label may be used with [C+1, C+1, M']. Therefore, node 602 may forward label 634 with [1, 1, 2] to its second next-hop, node 608.

At node 603, there are two subsequent nodes (next-hops), nodes 604 and 607. As such, node 603 is at ECMP level 2 and has two next-hops (M' value) for SID-List. The label is last modified at node 602 at ECMP level 1 and therefore, the C value at node 603 is 1. For the first next-hop, the label is modified with [C+1, I, M]. As such, node 603 may forward label 636 with [2, 0, 0] to its first next-hop, node 604. For the seconds next-hop, the label may be modified with [C+1, C+1, M']. Therefore, node 603 may forward label 638 with [2, 2, 2] to its second next-hop, node 607.

At node 608, there are three subsequent nodes (next-hops) including nodes 609, 611, and 612. As such, node 608 is at ECMP level 2 and has three next-hops (M' value) for SID-List. The label is last modified at node 602 at ECMP level 1 and therefore, the C value at node 608 is 1. For the first next-hop, the label is modified with [C+1, I, M]. As such, node 608 may forward label 640 with [2, 1, 2] to its first next-hop, node 609. For the second next-hop, the label may be modified with [C+1, C+1, M']. Therefore, node 608 may forward label 642 with [2, 2, 3] to its second next-hop, node 611. For the remaining next-hops, the label is modified with [C+1, C+1, 0]. As such, node 608 may forward label 644 with [2, 2, 0] to its third next-hop, node 612.

Furthermore, each of nodes 604, 607, 609, 611, and 612 has a single subsequent node and therefore, there are no multiple paths branched out from each of those nodes. Since there are no multiple subsequent nodes, each of those nodes forwards respective packets, without modifying the label, to the subsequent node. For example, nodes 604 and 607 may forward packets including label 636 with [2, 0, 0] and label 638 with [2, 2, 2], respectively, as received from their previous node (node 603) to node 605 without modifying the labels. Similarly, nodes 609, 611, and 612 may forward packets including label 640 with [2, 1, 2], label 642 with [2, 2, 3], and label 644 with [2, 2, 0], respectively, as received from their previous node (node 608) to node 610 without modifying the labels.

Moreover, nodes 605 and 610 have only one subsequent node, which is tail-end node 606. As such, nodes 605 and 610 may forward packets as received from the respective previous node to tail-end node 606. As such, tail-end node 606 may receive a total of five (5) packets, each of the packets including label 636 with [2, 0, 0], label 638 with [2, 2, 2], label 640 with [2, 1, 2], label 642 with [2, 2, 3], and label 644 with [2, 2, 0].

In the non-limiting example of FIG. 6, the network system 600 includes a total of five end-to-end multiple paths (e.g., ECMPs) and tail-end node 606 receives a total of five packets. As such, the total number of end-to-end multiple paths is equal to the number of packets received at the tail-end node, and therefore, the data plane for the given SID-List in FIG. 6 is validated.

While FIGS. 5 and 6 are described with reference to nodes 501-512 and five multiple paths, the validation process is equally applicable to any other network structure with non-multiple path (e.g., a single path) or multiple paths (e.g., ECMPs) with any suitable number of path(s) between a headend node and a tail-end node thereof.

Furthermore, although the example data plane validation processes in FIGS. 5 and 6 are described in the context of SRv6, the same can be applied in a similar manner in other data planes such as MPLS, SR MPLS, IPv6, and IPv4. In MPLS or SR MPLS, an entropy label can be used to achieve IPv6 flow label functionality. In IPv6, the flow label as described above in FIGS. 5 and 6 can be used. In IPv4, a specific value of source port can be used to indicate intermediate nodes that the packet should be forwarded to all next-hops (i.e., subsequent nodes) for the destination address (DA).

FIG. 7 illustrates a flow chart of a data plane validation process 700 for multiple paths in a segment routing network, according to some aspects of the present disclosure. Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

At step 710, the data plane validation process 700 includes generating, at the first network node, a test data packet with a label to be sent along each of multiple paths in the network between the first network node and a last network node. For example, the network controller (e.g., controller 212 of FIG. 2) can generate a test data packet (e.g., packet 530 in FIG. 5) with a label at the first network node (e.g., headend node 501 in FIG. 5).

In some examples, the data plane validation process 700 further includes identifying one or more intermediate nodes on each of multiple paths in the network, wherein the multiple paths begin at the first network node and end at a last network node. For example, a network controller (e.g., controller 212 of FIG. 2) can identify one or more intermediate nodes (e.g., nodes 502-505 and 507-510 as illustrated in FIG. 5) on each of multiple paths in the network (e.g., paths (1)-(5) as illustrated in FIG. 5). The multiple paths begin at the first network node (i.e., headend node) (e.g., node 501 in FIG. 5) and end at the last network node (i.e., tail-end node) (e.g., tail-end node 506 in FIG. 5).

In some examples, each node on multiple paths in the network (e.g., headend node, intermediate nodes, tail-end node) can be a router for segment routing (SR) to route data plane traffic of at least one of MPLS, SR MPLS, IPv4, or IPv6 network. For example, nodes 501-512 illustrated in FIG. 5 may be a router for segment routing that routes data plane traffic in MPLS, IPv4, or IPv6 network or a router without segment routing with data plane traffic for MPLS or IPv4 or IPv6 network.

In some examples, the label may include a total number of packets to be received at the last network node. In this case, the first network node or the last network node or a path computation element (PCE) or a network controller can determine if the number of the multiple paths equals to the number of packets received at the last network node based on the label.

When the label includes the number of packets (e.g., the multiple paths or the subsequent nodes that each node has), the number of packets is equivalent to the number of multiple paths from the first node to the last node.

In some instances, the label may include information associated with the number of packets, for example, a level of the multiple paths of a node that last modified the label (C), a level of the multiple paths of a node whose multiplier is in the label (I), and a multiplier representing a number of subsequent nodes (M), for example, [C, I, M] as described in FIG. 6, to calculate the number of packets to be received at the last network node. In this case, either the first network node or the last network node can determine if the number of the multiple paths equals to the number of packets received at the last network node based on the labels.

At step 715, the data plane validation process 700 includes forwarding the test data packet from the first network node, along each of the one or more intermediate nodes, to the last network node. For example, each of intermediate nodes 502-505 and 507-512 may forward data packets to their respective subsequent node(s), with or without modifying the label included in the data packet, as described above with reference to FIG. 6.

In some examples, the data plane validation process 700 includes modifying the label at an intermediate node that has multiple subsequent nodes, in particular, in case where the label does not include the total number of packets and instead includes relevant information to calculate the total number of packets. For example, node 502 as illustrated in FIG. 5, which has two subsequent nodes 503 and 508 may modify the label in the data packet 530 received from its previous node 501.

In another aspect, the data plane validation process 700 can further include forwarding packet with the label at an intermediate node in the network to all the ECMP multiple subsequent nodes.

At step 720, the data plane validation process 700 includes determining if the number of end-to-end multiple paths equals to the number of packets received at the last network node. In some instances, the number of end-to-end ECMPs can be dynamically determined based on the information encoded in the labels (i.e., without any topology information) at intermediate-nodes (i.e., mid-nodes) and carried by the test data packet. For example, network controller 212 as shown in FIG. 2 may determine if the number of end-to-end multiple paths, for example, paths (1)-(5) in FIG. 5, is equal to the number of packets, for example, packets 536, 538, 540, 542, and 544 in FIG. 5.

As previously described, in PM liveness detection, the data plane validation is performed by a headend node (e.g., headend node 501 in FIG. 5). In OAM mode, the data plane validation is performed by a tail-end node (e.g., tail-end node 506 in FIG. 5). In PM delay and packet loss measurement, the data plane validation is performed by a headend node or a tail-end node.

If the number of end-to-end multiple paths is equal to the number of packets received at the last node, the data plane validation is determined to have been successful at step 725.

However, if the number of end-to-end multiple paths is not equal to the number of packets received at the last node, the data plane validation is determined to have been failed at step 730.

A non-limiting example of a pseudocode of a set of computer-readable instructions for steps 720-730 of the data plane validation process 700 in FIG. 7 is provided below. The data plane validation process, as described in the below example, may be executed at a headend node for PM liveness detection while it may be executed at a tail-end node for OAM.

```
Input: Total number of received packets and flow labels of the received packets
Output: Success or failure of data plane validation
If W flag is set in the flow labels:
    If T flag is set in the flow labels:
        If value of total number of packets field in flow label == number of received packets:
            Return "Success"
        Else:
            Return "Failed"
    Else:  /* T flag is not set */
        /* Flow label of a received packet is denoted by [C, I, M] */
        If a test packet with [C, 0, 0] is not received:
            Return "Failed"
        Else:
            ecmp_level = 1
            total_num_end_to_end_ecmps = 1
            While (TRUE) {
                /* Calculate number of ECMP nodes at ECMP level of ecmp_level, using info in packets that are
                received from previously verified ECMP levels */
                num_ecmp_nodes = (number of packets with C >= ecmp_level and I < ecmp_level)
```

```
    If num_ecmp_nodes == 0:
       If total number of received packets == total_ num_end_to_end_ecmps:
          Return "Success"
       Else:
          Return "Failed"
    /* Each ECMP node sends a packet with its Multiplier (e.g., number of next-hops for sid-list) */
    num_packets_with_ecmp_node_info = (number of packets with I == ecmp_level and M > 0)
    If num_pockets_with_ecmp_node_info != num_ecmp_nodes:
       Return "Failed"
    /* Each ECMP node sends additional M-1 packets for a received packet */
    new_end_to_end_ecmps = (sum of M-1 for M in all packets with I == ecmp_level and M > 0)
    total_num_end_to_end_ecmps += new_end_to_end_ecmps
    ecmp_level++
 } /* While */
```

According to some examples, when the data plane validation is determined to have been failed at step 730, the data plane validation process 700 may further proceed to locating a failure in the network. For example, once the data plane validation process 700 detects a failure in the data plane (e.g., returning "failed" in the above-described algorithm), a location of the failure can be determined based on steps 735-750 as described below.

At step 735, the locating the failure in the network includes sending the flow label including a time-to-live (TTL) (or Hop Limit (HL)) field with incremental values in a header of the test data packet. When the TTL (or HL) value of the test data packet sent by headend is T, the TTL field becomes a zero at one or more nodes, which can be denoted by node-N, on multiple paths. For example, a headend node (e.g., node 501 in FIG. 5) sends OAM probes with a flow label and incremental TTL (or HL) values.

At step 740, the locating the failure in the network further includes sending one or more expiry messages from each of the one or more node-N to the first network node. For example, when probe-P with the TTL value of T traverses the network, its TTL value may be decremented and becomes zero at one or more node-N. Then, each of the one or more node-N can send an Internet Control Message Protocol (ICMP) TTL expiry message to the first network node (e.g., headend node 501 as illustrated in FIG. 5). A source address (SA) of the ICMP TTL expiry message may be set to the non-link local address of the ingress interface on which probe-P is received at the one or more node-N.

At step 745, the locating the failure in the network further includes determining that a number of the one or more expiry messages is not equal to a total number of multiple paths from the first network node to the one or more node-N. For example, when the number of ICMP TTL expiry messages sent by the one or more node-N is equivalent to the total number of multiple paths (e.g., ECMPs) from the first network node (e.g., headend node 501) to the one or more node-N, no forwarding issue is determined between the first network node and the one or more node-N.

On the other hand, when the number of ICMP TTL expiry messages sent by the one or more node-N is not equivalent to the number of multiple paths (e.g., ECMPs) from the first network node (e.g., headend node 501) to the one or more node-N, an issue can be determined in forwarding packets to the one or more node-N from one or more of their immediate previous node(s)/hop(s). The one or more immediate previous hops (IPHs) that successfully forward probes to one or more node-N can be identified using topology information and the source address of ICMP TTL expiry messages sent by the one or more node-N. For example, one or more node-N does not receive probes from the remaining IPHs due to a failure that has occurred between the remaining IPHs and the one or more node-N.

In some examples, if ICMP TTL expiry messages do not use probe-P's ingress interface address as the sources address, the failure can be still identified based on a ping from each node of immediate previous hops (IPHs). For example, a ping from each node in the set of IPHs may identify which link (e.g., location of the failure) has the issue.

At step 750, the locating the failure in the network further includes determining that the failure in forwarding packets has occurred between one of the one or more node-N and an immediate previous node of the one or more node-N. For example, based on the determination at step 745 that the number of the one or more expiry messages is not equal to a total number of multiple paths from the first network node to the one or more node-N, the location of the failure in forwarding packets can be identified as a link between a node-N and its immediate previous node.

Furthermore, following proof shows that the data plane validation algorithm correctly validates the data plane when T flag is not set:

Proof by Induction:

Show that Number of End-to-End Paths Calculated for ECMP Level 0 is Correct:
  Testing packet injected by the control plane of the headend has [0, 0, 0]. If there is at least a single end-to-end path, tail-end must receive a test packet with [C, 0, 0]. If this packet is not received, data plane has errors.
  If C==0, this packet has not traversed another ECMP node. Thus, there are no ECMP nodes at ECMP level 1, and there is only one end-to-end path. Hence, data plane validation is complete.
  If C>0, this packet has traversed ECTMP nodes. Thus, there is an ECMP node at ECMP level-1 (there can be only one ECMP node at level-).

Show that Number of End-to-End Paths Calculated for ECMP Level 1 is Correct:
  If there is an ECMP node at level-1, it must send a packet with [C2, 1, M1] where C2>=1 and M1 is the number of next-hops for the SID-List at this ECMP node. If this packet is not received, data plane is invalidated.
  Since there are M1 paths from this ECMP node towards tail-end, M1 packets with [1, *, *] are sent out by this node, where * means any value. If there are ECMP nodes at ECMP level 2, one or more packets of the M1 packets must have C>=2. Thus, number of ECMP nodes at ECMP level-2 is the number of packets with C>=2 and I<2.

Therefore, if there are no ECMP nodes at ECMP level-2, tail-end must receive M1 packets to validate the data plane.

If there are ECMP nodes at ECMP level-2, algorithm continues.

Show that number of end-to-end paths calculated for ECMP level n+1 is correct assuming the calculation for ECMP level-n is correct:

Assume there are K number of ECMP nodes at ECMP level n, and that the total number of end-to-end ECMPs at the end of ECMP level n is L.

The K ECMP nodes at ECMP level n sends out packets with [n, I, *] where I<n. These packets must be received by the headend/tail-end to validate the data plane with L end-to-end ECMPs.

If there are ECMP nodes at ECMP level (n+1), some of the packets sent out by nodes at ECMP level n will have [C, I, *] where C>n and I<=n, when the packets reach tail-end.

Thus, the number of ECMP nodes at ECMP level (n+1) is the number of packets with [C, I, *] where C>n and I<=n.

If there are no ECMP nodes at ECMP level (n+1), there are only L end-to-end ECMPs. Thus, headend/tail-end must receive L packets to validate the data plane.

If there are P (P>0) number of ECMP nodes at ECMP level (n+1), each of those nodes must send a packet with its multiplier. If headend/tail-end does not receive P packets with [C, I, M] where C>n, I=n+1 and M>0, data plane has errors.

If Qth node among the P nodes has multiplier M, this node introduces M−1 new end-to-end ECMPs. Thus, the total number of new end-to-end ECMPs due to ECMP nodes at ECMP level (n+1) is the sum of (M−1) for M of each node among the P nodes. Let this number be R. Thus, the total number of end-to-end ECMPs after validating ECMP level (n+1) is L±R.

If there are no ECMP nodes at ECMP level (n+1), headend/tail-end must receive L+R packets to validate the data plane. If there are ECMP nodes at ECMP level (n+1), algorithm continues.

Proof complete.

According to some examples, a micro-loop (i.e., transient loop) may occur in a network where a particular network node that has not yet converged to an updated network topology sends or forwards network traffic to a next-hop (i.e., subsequent node) that has already updated network topology. Then, the next-hop (i.e., subsequent node) may forward the network traffic back to the particular network node, and therefore a micro-loop may be created where the network traffic loops around between the two nodes.

In SR MPLS and SRv6 data planes, a micro-loop may be prevented by the segment routing (SR) uloop avoidance feature. In other data planes, the following two methods can be implemented to detect a micro-loop and stop sending probes.

The first method is based on a TTL (or HL) field. When a micro-loop contains a node with multiple ECMP next-hops (i.e., subsequent nodes) for the destination address (DA) in the packet, the following methods can be utilized depending on whether the network is a PM liveness detection loopback mode or OAM mode.

In the PM liveness detection loopback mode, a micro-loop can be identified if the TTL decrement of a PM probe that is received back at the headend node is higher than the maximum roundtrip hop count. Once identified, the PM session may stop sending probes. In some examples, the maximum roundtrip hop count may be the maximum hop count on an end-to-end ECMP plus the hop count on the returned path. In other examples, the maximum roundtrip hop count can be calculated by a headend node or PCE based on the network topology or can be configured by a user.

In an OAM mode, in some examples, a headend node may receive an ICMP TTL expiry message from the OAM probe that loops in the micro-loop, which may eventually reach the TTL value of zero. A micro-loop may be identified based on the receipt of this ICMP TTL expiry message. In other examples in the OAM mode, a micro-loop can be identified if the TTL decrement of OAM probes that are received at a tail-end node is higher than the maximum hop count on an end-to-end ECMP. Similar to the examples in the PM liveness detection loopback mode as previously described, the maximum roundtrip hop count can be calculated by a headend node or PCE based on the network topology or can be configured by a user.

On the other hand, if a micro-loop does not contain a node with multiple ECMP next-hops for the DA in the data packet, in a PM liveness detection loopback mode, a headend node may not receive PM probes via at least one end-to-end ECMP. If a predefined or a configured number of consecutive probes are not received, PM session will stop sending probes. In an OAM mode, if a micro-loop does not contain a node with multiple ECMP next-hops for the DA, a micro-loop can be identified based on the receipt of ICMP TTL expiry message.

The second method is based on a flow label where a micro-loop can be identified when a packet has a flow label, and the egress interface for the packet is the same as the ingress interface. In this case, the node will drop the packet and prevent looping of PM or OAM probes between two adjacent nodes.

According to some examples, when a node receives a test packet, the node can perform a route lookup. If multiple next-hops (i.e., subsequent nodes) are identified, the node can execute a hashing algorithm to determine to which next-hop the packet should be sent, for example, the hashing algorithm returns all the next-hops instead of a single next-hop. Then, the node can copy the packet and forward it to each of the next-hops. As a result, all the forwarding entries (i.e., packets) can be exercised and tested.

In some examples, a node can be upgraded incrementally (e.g., to allow the existence of upgraded and non-upgraded nodes in a network). For example, if a node, which has not been upgraded, receives a packet with a flow label, the node can forward the packet as it forwards any other data packet. On the other hand, an upgraded node, upon receiving the packet with the flow label, can check another criterion, for example, a destination UDP port of the packet, to make sure only OAM/PM test packets are forwarded to all the next-hops (i.e., subsequent nodes) by configuring a set of ports to be checked in this criterion. This way a network operator may upgrade nodes incrementally to allow the existence of upgraded and non-upgraded nodes in the network.

In some instances, when a punt rate is high (e.g., 20 k PPS per line card), several SID-Lists with a large number of end-to-end ECMPs can be validated simultaneously. In other instances, the SID-Lists can be serially validated.

Examples of validating multiple paths for packet forwarding in a segment routing network described above can provide the following advantages compared to currently available methods. For example, the validation process of the present disclosure can validate the data plane by validating all the end-to-end multiple paths (e.g., ECMPs) as soon as the data plane changes (e.g., a next-hop that is down coming up). For example, when a link goes up or down, the number of next-hops (i.e., the number of available subsequent paths) may also change, and therefore the present disclosure may validate all the end-to-end ECMPs immediately when such change occurs.

The present disclosure can be also applicable for deterministic OAM, PM liveness detection and PM delay and packet loss measurement. A further example advantage is its applicability for SRv6 (including SRv6 CSID/uSID), SR MPLS, IPv4, and IPv6 data planes. Other example advantages include its ability to exercise the true date plane since there is no control plane intervention that enables fast data packet forwarding at intermediate nodes.

Also, the data plane validation process described herein can be agnostic to the Fast Reroute (FRR) state in the network, is stateless at intermediate nodes (i.e., mid-nodes), uses test packets that mimic customer data packets, can operate without any topology information, and does not require headend and mid-nodes to calculate flow labels to steer test packets via end-to-end ECMPs (i.e., no query phase to identify flow labels).

Furthermore, the data plane validation process described herein can be used for detecting if multi-hop point-to-point links have any ECMPs, is able to test layer-2 ECMPs, can automatically detect if there is an issue with any end-to-end ECMPs, and minimize the number of test packets to be injected by the headend node.

Following disclosure with respect to FIGS. 7 and 8 illustrates example network devices and computing devices, such as switches, routers, load balancers, client devices, and so forth. Such example network and computing devices may be used to implement various components described above with reference to FIGS. 1-7 including, but not limited to, network controller 212, any one of nodes 501-512, 520, and 525, etc.

FIG. 8 illustrates an example network device 800 suitable for performing switching, routing, load balancing, and other networking operations, according to some aspects of the present disclosure. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

Figure 9:
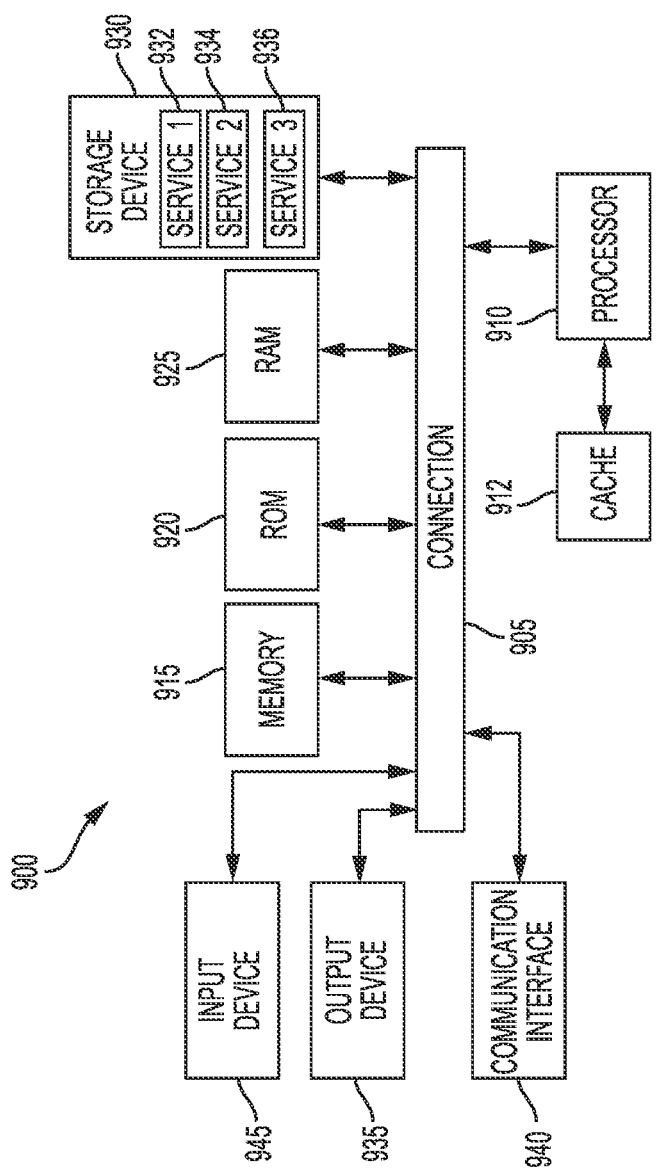
FIG. 9 shows an example computing system, which can be for example any computing device that can implement components of the system.

FIG. 9 illustrates an example computing system 900 including components in electrical communication with each other using a connection 905 upon which one or more aspects of the present disclosure can be implemented. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900.

Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method of validating packet forwarding on multiple paths in a network, the method comprising:
generating, at a first network node, a test data packet with a label to be sent through one or more intermediate nodes between the first network node and a last network node;

forwarding the test data packet from the first network node, along each of the one or more intermediate nodes the last network node;
determining multiple paths between the first network node and the last network node based on packets received at the first network node from the last network node;
performing a data plane validation process to validate the packet forwarding on the multiple paths between the first network node and the last network node;
comparing a number of the multiple paths with a number of packets received at the last network node; and
based on the comparing, determining whether the data plane validation process was successful.

2. The method of claim 1, further comprising:
identifying, by a network controller or the first network node, the one or more intermediate nodes.

3. The method of claim 1, further comprising:
modifying the label at an intermediate node of the one or more intermediate nodes in the network that has multiple subsequent nodes.

4. The method of claim 1, wherein the label includes information for determining a number of packets to be received at the last network node and wherein the data plane validation process is performed by either the first network node or the last network node based on the label in each of the received packets.

5. The method of claim 4, wherein the information associated with the number of packets includes a level of the multiple paths of a node that last modified the label, a level of the multiple paths of a node whose multiplier is in the label, and a multiplier representing a number of subsequent nodes.

6. The method of claim 1, wherein the data plane validation process fails if a number of the multiple paths is not equal to a number of packets received by the last network node.

7. The method of claim 6, wherein when the data plane validation process fails, the method further includes:
locating a failure in the network by:
sending the label including a time-to-live (TTL) field in a header of the test data packet, wherein the TTL field becomes zero at one or more node-N;
sending one or more expiry or error messages, from each of the one or more node-N to the first network node;
determining that a number of the one or more expiry or error messages is not equal to a total number of multiple paths from the first network node to the one or more node-N; and
determining that the failure in forwarding packets has occurred between the one or more node-N and an immediate previous node of the one or more node-N.

8. The method of claim 1, wherein each of the first network node, the last network node, and the one or more intermediate nodes is a router for at least one of Multi-Protocol Label Switching (MPLS), IPv4, IPv6 or segment routing, wherein the segment routing is routing data plane traffic of at least one of MPLS, IPv4, or IPv6 network.

9. A system for validating packet forwarding on multiple paths in a network, the system comprising:
one or more computer-readable media comprising computer-readable instructions; and
one or more processors configured to execute the computer-readable instructions to:
generate, at a first network node, a test data packet with a label to be sent through one or more intermediate nodes between the first network node and a last network node;
forward the test data packet from the first network node, along each of the one or more intermediate nodes to the last network node;
determine multiple paths between the first network node and the last network node based on packets received at the first network node from the last network node;
perform a data plane validation process to validate the packet forwarding on the multiple paths between the first network node and the last network node;
compare a number of the multiple paths with a number of packets received at the last network node; and
based on the comparing, determine whether the data plane validation process was successful.

10. The system of claim 9, wherein the one or more processors are further configured to execute the computer-readable instructions to modify the label at an intermediate node of the one or more intermediate nodes in the network that has multiple subsequent nodes.

11. The system of claim 9, wherein the label includes information for determining a number of packets to be received at the last network node and wherein the data plane validation process is performed by either the first network node or the last network node based on the label in each of the received packets.

12. The system of claim 11, wherein the information associated with the number of packets includes a level of the multiple paths of a node that last modified the label, a level of the multiple paths of a node whose multiplier is in the label, and a multiplier representing a number of subsequent nodes.

13. The system of claim 9, wherein the data plane validation process fails if a number of the multiple paths is not equal to a number of packets received by the last network node.

14. The system of claim 9, wherein the one or more processors are further configured to execute the computer-readable instructions to, when the data plane validation process fails, locate a failure in the network by executing the computer-readable instructions to:
send the label including a time-to-live (TTL) field in a header of the test data packet, wherein the TTL field becomes zero at one or mode node-N;
send one or more expiry or error messages, from each of the one or more node-N to the first network node;
determine that a number of the one or more expiry or error messages is not equal to a total number of multiple paths from the first network node to the one or more node-N; and
determine that the failure in forwarding packets has occurred between the one or more node-N and an immediate previous node of the one or more node-N.

15. One or more non-transitory computer-readable media comprising computer-readable instructions, which when executed by one or more processors, cause the processors to:
generate, at a first network node, a test data packet with a label to be sent through one or more intermediate nodes between the first network node and a last network node;
forward the test data packet from the first network node, along each of the one or more intermediate nodes to the last network node;

determine multiple paths between the first network node and the last network node based on packets received at the first network node from the last network node;

perform a data plane validation process to validate the packet forwarding on the multiple paths between the first network node and the last network node;

compare a number of the multiple paths with a number of packets received at the last network node; and based on the comparing, determine whether the data plane validation process was successful.

16. The one or more non-transitory computer-readable media of claim 15, wherein the execution of the computer-readable instructions further cause the one or more processors to modify the label at an intermediate node of the one or more intermediate nodes in the network that has multiple subsequent nodes.

17. The one or more non-transitory computer-readable media of claim 15, wherein the label includes information for determining a number of packets to be received at the last network node and wherein the data plane validation process is performed by either the first network node or the last network node based on the label in each of the received packets.

18. The one or more non-transitory computer-readable media of claim 17, wherein the information associated with the number of packets includes a level of the multiple paths of a node that last modified the label, a level of the multiple paths of a node whose multiplier is in the label, and a multiplier representing a number of subsequent nodes.

19. The one or more non-transitory computer-readable media of claim 15, wherein the data plane validation process fails if a number of the multiple paths is not equal to a number of packets received by the last network node.

20. The one or more non-transitory computer-readable media of claim 19, wherein the execution of the computer-readable instructions further cause the one or more processors to, when the data plane validation process fails, locate a failure in the network by causing the one or more processors to:

send the label including a time-to-live (TTL) field in a header of the test data packet, wherein the TTL field becomes zero at one or more node-N;

send one or more expiry or error messages, from each of the one or more node-N to the first network node;

determine that a number of the one or more expiry or error messages is not equal to a total number of multiple paths from the first network node to the one or more node-N; and determine that the failure in forwarding packets has occurred between the one or more node-N and an immediate previous node of the one or more node-N.

* * * * *